United States Patent
Wang et al.

(10) Patent No.: US 10,839,257 B2
(45) Date of Patent: Nov. 17, 2020

(54) PRIORITIZING OBJECTS FOR OBJECT RECOGNITION

(71) Applicant: QUALCOMM Incorporated, San Diego, CA (US)

(72) Inventors: Lei Wang, Clovis, CA (US); Ning Bi, San Diego, CA (US); Ronald Karyodisa, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 109 days.

(21) Appl. No.: 16/107,879

(22) Filed: Aug. 21, 2018

(65) Prior Publication Data

US 2019/0065895 A1    Feb. 28, 2019

Related U.S. Application Data

(60) Provisional application No. 62/552,165, filed on Aug. 30, 2017.

(51) Int. Cl.
*G06K 9/62* (2006.01)
*G06K 9/00* (2006.01)
(Continued)

(52) U.S. Cl.
CPC ......... *G06K 9/623* (2013.01); *G06K 9/00228* (2013.01); *G06K 9/00261* (2013.01);
(Continued)

(58) Field of Classification Search
CPC ............... G06K 9/623; G06K 9/00228; G06K 9/00261; G06K 9/00288; G06K 9/00295;
(Continued)

(56) References Cited

U.S. PATENT DOCUMENTS

2009/0232364 A1    9/2009   Hosoi
2011/0188713 A1*   8/2011   Chin ..................... G06F 16/583
                                                            382/118
(Continued)

FOREIGN PATENT DOCUMENTS

CN    107633209 A    1/2018
EP      3098755 A1   11/2016

OTHER PUBLICATIONS

Dennis Mitzel, Real-Time Multi-Person Tracking with Time-Constrained Detection, Jan. 1, 2011, Proceedings of the British Machine Vision Conference, p. 1-11. (Year: 2011).*

(Continued)

*Primary Examiner* — Brenda C Bernardi
(74) *Attorney, Agent, or Firm* — Polsinelli/Qualcomm

(57) ABSTRACT

Techniques and systems are provided for prioritizing objects for object recognition in one or more video frames. For example, a current video frame is obtained, and a objects are detected in the current video frame. State information associated with the objects is determined. Priorities for the objects can also be determined. For example, a priority can be determined for an object based on state information associated with the object. Object recognition is performed for at least one object from the objects based on priorities determined for the at least one object. For instance, object recognition can be performed for objects having higher priorities before objects having lower priorities.

30 Claims, 9 Drawing Sheets

| State_pre \ State_cur | New | Confirmed | Not_confirmed | Pre_Stranger | Stranger |
|---|---|---|---|---|---|
| New | id==id_pre && $T_1 \leq S < T_2$ & & $C < c_1$ | (S≥$T_2$) \|\| (id==id_pre && $T_1 < S < T_2$ && C>$c_1$) | id!=id_pre | S≤$T_0$ | S<$T_0$ && C>=$c_0$ |
| Confirmed |  | id==id_pre | id!=id_pre && S>$T_0$ | id!=id_pre && S ≤ $T_0$ |  |
| Not_confirmed | id==id_pre && $T_1 \leq S < T_2$ | S>$T_2$ | id!=id_pre | S <$T_0$ |  |
| Pre_stranger | id==id_pre && $T_1 \leq S < T_2$ |  | id==id_pre&& $T_0 \leq S < T_1$ | id==id_pre & S<$T_0$&&C< $c_0$ | id==id_pre && S<$T_0$&& C>=$c_0$ |
| Stranger | id==id_pre && $T_1 \leq S < T_2$ & C>=$c_1$ |  |  | id==id_pre & $T_0 \leq S < T_1$ | id==id_pre && S<$T_0$ |

(51) Int. Cl.
*G06T 7/246* (2017.01)
*G06K 9/20* (2006.01)

(52) U.S. Cl.
CPC ..... *G06K 9/00288* (2013.01); *G06K 9/00295* (2013.01); *G06K 9/00771* (2013.01); *G06K 9/6201* (2013.01); *G06T 7/246* (2017.01); *G06K 9/2054* (2013.01); *G06T 2207/10016* (2013.01); *G06T 2207/30201* (2013.01); *G06T 2207/30232* (2013.01)

(58) Field of Classification Search
CPC ............. G06K 9/00771; G06K 9/6201; G06K 9/2054; G06T 7/246; G06T 2207/10016; G06T 2207/30201; G06T 2207/30232
See application file for complete search history.

(56) References Cited

U.S. PATENT DOCUMENTS

| | | |
|---|---|---|
| 2013/0101167 A1 | 4/2013 | Holeva et al. |
| 2016/0350587 A1* | 12/2016 | Bataller .................... G06T 7/80 |
| 2017/0068842 A1* | 3/2017 | Garcia ............... G06K 9/00288 |
| 2017/0270389 A1 | 9/2017 | Skaff et al. |
| 2018/0060662 A1 | 3/2018 | Dharman et al. |

OTHER PUBLICATIONS

Michalis Zervos, Multi-camera face detection and recognition applied to people tracking, Jan. 1, 2013, Master Thesis, p. 1-67. (Year: 2013).*

International Search Report and Written Opinion—PCT/US2018/047611—ISA/EPO—dated Nov. 13, 2018.

* cited by examiner

| State_pre \ State_cur | New | Confirmed | Not_confirmed | Pre_Stranger | Stranger |
|---|---|---|---|---|---|
| New | Id==Id_pre && $T_1 \leq S < T_2$ && $C < C_1$ | $(S \geq T_2)$ \|\| (Id==Id_pre && $T_1 < S < T_2$ && $C > C_1$) | Id!=Id_pre | $S \leq T_0$ | $S < T_0$ && $C >= C_0$ |
| Confirmed | ✗ | Id==Id_pre | Id!=Id_pre && $S > T_0$ | Id!=Id_pre && $S \leq T_0$ | ✗ |
| Not_confirmed | Id==Id_pre && $T_1 \leq S < T_2$ | $S > T_2$ | Id!=Id_pre | $S < T_0$ | ✗ |
| Pre_stranger | Id==Id_pre && $T_1 \leq S < T_2$ | ✗ | Id==Id_pre && $T_0 \leq S < T_1$ | Id==Id_pre && $S < T_0$ && $C < C_0$ | Id==Id_pre && $S < T_0$ && $C >= C_0$ |
| Stranger | Id==Id_pre && $T_1 \leq S < T_2$ && $C >= C_1$ | ✗ | ✗ | Id==Id_pre && $T_0 \leq S < T_1$ | Id==Id_pre && $S < T_0$ |

FIG. 6

| State | Base priority |
|---|---|
| Stranger | $P_1$ |
| Confirmed | $P_2 = P_1 + N_1, N_1 > 0$ |
| Pre_stranger | $P_3 = P_2 + N_2, N_2 > 0$ |
| Not_confirmed | $P_4 = P_3 + N_3, N_3 > 0$ |
| New | $P_5 = P_4 + N_4, N_4 > 0$ |

FIG. 7

PRIORITIZING OBJECTS FOR OBJECT RECOGNITION

CROSS-REFERENCE TO RELATED APPLICATIONS

This application claims the benefit of U.S. Provisional Application No. 62/552,165, filed Aug. 30, 2017, which is hereby incorporated by reference, in its entirety and for all purposes.

FIELD

The present disclosure generally relates to object recognition, and more specifically to techniques and systems for prioritizing objects for object recognition.

BACKGROUND

Object recognition can be used to identify or verify an object from a digital image or a video frame of a video clip. One example of object recognition is face recognition, where a face of a person is detected and recognized. In some cases, the features of a face are extracted from an image and compared with features stored in a database in an attempt to recognize the face. In some cases, the extracted features are fed to a classifier and the classifier will give the identity of the input features. Object recognition is a time and resource intensive process.

BRIEF SUMMARY

In some examples, techniques and systems are described for prioritizing objects in images for performing object recognition. For example, objects can be detected and tracked across a sequence of video frames. At each video frame, the objects can be prioritized for an object recognition process. The object recognition process can then be performed on the objects having the highest priorities. For example, an object with a higher priority will be processed earlier than an object with a lower priority. In some cases, the techniques and systems are used for prioritizing faces in video frames for face recognition.

The priorities for the objects are updated using a set of rules that are based on states assigned the objects. The states are determined based on the results of object tracking performed for each video frame. For example, a state of an object can be determined for a current video frame based on a previous state of the object in one or more previous video frames, based on a unique object identifier associated with the object in the current video frame, based on a confidence score for the object determined from a previous object recognition process performed for the object, and/or based on a history counter assigned to the object. A history counter for an object counts the number of times the object has been in a certain state and/or the number of times the object has been recognized with a confidence score above or below one or more confidence thresholds.

The states assigned to the objects can include a new state, a confirmed state, a non-confirmed state (also called a not-confirmed state), a pre-stranger state, and a stranger state. The new state can be assigned to an object that is not matched to any previously detected and/or tracked object. An object can also be assigned the new state when a unique object identifier of the object matches a unique object identifier of an object detected and tracked in a previous frame and, in some cases, when other conditions are met based on the confidence score and/or the history counter of the object. An object can be assigned a confirmed state when the confidence score of the object is higher than a high confidence threshold, indicating that there is a high confidence that the object matches an object registered in a database of known objects (e.g., objects enrolled with the object recognition system). The non-confirmed state can be assigned to an object that has an identifier mismatch between the unique object identifier of the object in the current video frame and a unique object identifier of a previous object in a previous video frame that is matched to the object for the current video frame (e.g., based on an overlap between a bounding box of the object and a bounding box of the previous object, or other suitable matching technique). In some cases, the non-confirmed state can be assigned based on the confidence score determined for the object.

States can also be assigned based on whether an object exhibits characteristics of a stranger. As used herein, the term stranger refers to an object that is not registered in a database of known objects. A pre-stranger status can be assigned to an object that has a confidence score below a minimum confidence threshold that is used to identify a stranger, but has a history counter value indicating the object has not been detected as a stranger for a threshold number of frames. A stranger status can be assigned to an object that has a confidence score below a minimum confidence threshold and that has a history counter value indicating the object has been detected as a stranger for the threshold number of frames. Other factors can also be used to determine the statuses of objects.

A base priority can be defined for each state. Objects having the "new" state can have a highest base priority, as compared to base priorities of objects having other states. A next highest base priority is defined for a non-confirmed state, followed by the pre-stranger state, the confirmed state, and the stranger state, in descending order. When an object is newly assigned a certain state, the base priority defined for that state is assigned to the object. For example, if a face or other object is recognized in a current frame and its state is changed to a different state, the priority for the face will be updated to the base priority of the newly assigned state. In some cases, if the state of an object is maintained in its current state in a current frame (in which case the state is not updated to a different state), the priority for the object will be increased by a pre-defined amount. In some cases, if an object is detected and tracked in a current frame, but is not recognized in the current frame, the priority of the object will be increased by the pre-defined amount.

Using the techniques and systems described herein, object recognition (including face recognition) can achieved in real-time with high accuracy. As used herein, the term "real-time" refers to recognizing objects in a video sequence as the video sequence is being captured.

According to at least one example, a method of prioritizing objects for object recognition in one or more video frames provided. The method includes obtaining a current video frame, and detecting a plurality of objects in the current video frame. The method further includes determining state information associated with the plurality of objects. The method further includes determining priorities for the plurality of objects. A priority is determined for an object based on state information associated with the object. The method further includes performing object recognition for one or more objects from the plurality of objects based on one or more priorities determined for the one or more objects. Object recognition is performed for objects having higher priorities before objects having lower priorities.

In another example, an apparatus for prioritizing objects for object recognition in one or more video frames is provided that includes a memory configured to store video data and a processor. The processor is configured to and can obtain a current video frame, and detecting a plurality of objects in the current video frame. The processor is further configured to and can determine state information associated with the plurality of objects. The processor is further configured to and can determine priorities for the plurality of objects. A priority is determined for an object based on state information associated with the object. The processor is further configured to and can perform object recognition for one or more objects from the plurality of objects based on one or more priorities determined for the one or more objects. Object recognition is performed for objects having higher priorities before objects having lower priorities.

In another example, a non-transitory computer-readable medium is provided that has stored thereon instructions that, when executed by one or more processors, cause the one or more processor to: obtain a current video frame; detect a plurality of objects in the current video frame; determine state information associated with the plurality of objects; determine priorities for the plurality of objects, wherein a priority is determined for an object based on state information associated with the object; and perform object recognition for one or more objects from the plurality of objects based on one or more priorities determined for the one or more objects, wherein object recognition is performed for objects having higher priorities before objects having lower priorities.

In another example, an apparatus for prioritizing objects for object recognition in one or more video frames is provided. The apparatus includes means for obtaining a current video frame, and means for detecting a plurality of objects in the current video frame. The apparatus further includes means for determining state information associated with the plurality of objects. The apparatus further includes determining priorities for the plurality of objects. A priority is determined for an object based on state information associated with the object. The apparatus further includes means for performing object recognition for one or more objects from the plurality of objects based on one or more priorities determined for the one or more objects. Object recognition is performed for objects having higher priorities before objects having lower priorities.

In some aspects, the plurality of objects include a plurality of faces, and the object recognition includes face recognition.

In some aspects, the methods, apparatuses, and computer-readable medium described above further comprise: obtaining object identifiers, confidence scores, and history counter information for the plurality of objects, wherein history counter information for an object indicates at least a number of frames the object has had a current state; and determining the state information for the plurality of objects based on the object identifiers, the confidence scores, and the history counter information for the plurality of objects.

In some aspects, the methods, apparatuses, and computer-readable medium described above further comprise: increasing a priority for an object for the current video frame by a pre-defined amount in response to a state of the object being maintained in a current state for the current frame.

In some aspects, the methods, apparatuses, and computer-readable medium described above further comprise: tracking the plurality of objects in the current video frame, wherein tracking includes matching an object in the current video frame with a previously detected object; and updating the state information associated with the plurality of objects based on results of the tracking. In some aspects, tracking includes matching bounding boxes of the plurality of objects in the current video frame with bounding boxes of a plurality of objects detected in a previous video frame. In some cases, tracking an object includes: determining one or more key points from an object detected in a previous video frame, and matching the one or more key points from the object detected in the previous frame with one or more key points from the object detected in the current video frame. In some cases, an object detected in the current video frame that is not matched with any object detected in a previous video frame is assigned a new state, wherein objects assigned a new state are given a higher base priority than objects assigned to other states.

In some aspects, the methods, apparatuses, and computer-readable medium described above further comprise: determining an object detected in the current video frame has a new state; determining an object identifier for the object matches an object identifier of a previously detected object that matches the object in the current video frame; determining a confidence score for the object is greater than a first confidence threshold and is less than a second confidence threshold, the first confidence threshold being less than the second confidence threshold; determining a history counter for the object is less than a first counter threshold, the first counter threshold including a count of a number of video frames the confidence score for the object is greater than the first confidence threshold; and maintaining a state of the object in the new state based on the confidence score for the object being greater than the first confidence threshold and less than the second confidence threshold and based on the history counter for the object being less than the first counter threshold. In some aspects, the methods, apparatuses, and computer-readable medium described above further comprise increasing a priority for the object by a pre-defined amount in response to the state of the object being maintained in the new state.

In some aspects, the methods, apparatuses, and computer-readable medium described above further comprise: determining an object detected in the current video frame has a new state; determining a confidence score for the object is greater than a second confidence threshold; and changing a state of the object from the new state to a confirmed state based on the confidence score for the object being greater than the second confidence threshold, the confirmed state indicating a confirmation that object recognition previously performed on the object was successful. In some aspects, the methods, apparatuses, and computer-readable medium described above further comprise changing a priority for the object to a base priority associated with the confirmed state in response to changing the state of the object from the new state to the confirmed state, wherein the base priority associated with the confirmed state is less than a base priority associated with the new state.

In some aspects, the methods, apparatuses, and computer-readable medium described above further comprise: determining an object detected in the current video frame has a new state; determining an object identifier for the object matches an object identifier of a previously detected object that matches the object in the current video frame; determining a confidence score for the object is greater than a first confidence threshold and is less than a second confidence threshold, the first confidence threshold being less than the second confidence threshold; determining a history counter for the object is greater than a first counter threshold, the first counter threshold including a count of a number of video frames the confidence score for the object is greater than the first confidence threshold; and changing a state of the object from the new state to a confirmed state based on the confidence score for the object being greater than the first confidence threshold and less than the second confidence threshold and based on the history counter for the object being greater than the first counter threshold. In some aspects, the methods, apparatuses, and computer-readable medium described above further comprise increasing a priority for the object by a pre-defined amount in response to the state of the object being maintained in the new state.

In some aspects, the methods, apparatuses, and computer-readable medium described above further comprise: determining an object detected in the current video frame has a new state; determining an object identifier for the object does not match an object identifier of a previously detected object that matches the object in the current video frame; and changing a state of the object from the new state to a non-confirmed state based on the object identifier for the object not matching the object identifier of the previously detected object. In some aspects, the methods, apparatuses, and computer-readable medium described above further comprise changing a priority for the object to a base priority associated with the non-confirmed state in response to changing the state of the object from the new state to the non-confirmed state, wherein the base priority associated with the non-confirmed state is less than a base priority associated with the new state.

In some aspects, the methods, apparatuses, and computer-readable medium described above further comprise: determining an object detected in the current video frame has a new state; determining a confidence score for the object is less than a minimum confidence threshold, wherein the minimum confidence threshold is used to identify a stranger, and wherein a stranger is an object not registered in a database of known objects; and changing a state of the object from the new state to a pre-stranger state based on the confidence score for the object being less than the minimum confidence threshold. In some aspects, the methods, apparatuses, and computer-readable medium described above further comprise changing a priority for the object to a base priority associated with the pre-stranger state in response to changing the state of the object from the new state to the pre-stranger state, wherein the base priority associated with the pre-stranger state is less than a base priority associated with the new state.

In some aspects, the methods, apparatuses, and computer-readable medium described above further comprise: determining an object detected in the current video frame has a new state; determining a confidence score for the object is less than a minimum confidence threshold, wherein the minimum confidence threshold is used to identify a stranger, and wherein a stranger is an object not registered in a database of known objects; determining a history counter for the object is greater than a minimum counter threshold, the minimum counter threshold including a count of a number of video frames the confidence score for the object is less than the minimum confidence threshold; and changing a state of the object from the new state to a stranger state based on the confidence score for the object being less than the minimum confidence threshold and based on the history counter for the object being greater than the minimum counter threshold. In some aspects, the methods, apparatuses, and computer-readable medium described above further comprise changing a priority for the object to a base priority associated with the stranger state in response to changing the state of the object from the new state to the stranger state, wherein the base priority associated with the stranger state is less than a base priority associated with the new state.

In some aspects, the methods, apparatuses, and computer-readable medium described above further comprise: determining an object detected in the current video frame has a confirmed state, the confirmed state indicating a confirmation that object recognition previously performed on the object was successful; determining an object identifier for the object matches an object identifier of a previously detected object that matches the object in the current video frame; and maintaining a state of the object in the confirmed state based on the object identifier for the object matching the object identifier of the previously detected object. In some aspects, the methods, apparatuses, and computer-readable medium described above further comprise increasing a priority for the object by a pre-defined amount in response to the state of the object being maintained in the confirmed state.

In some aspects, the methods, apparatuses, and computer-readable medium described above further comprise: determining an object detected in the current video frame has a confirmed state, the confirmed state indicating a confirmation that object recognition previously performed on the object was successful; determining an object identifier for the object does not match an object identifier of a previously detected object that matches the object in the current video frame; determining a confidence score for the object is greater than a minimum confidence threshold, wherein the minimum confidence threshold is used to identify a stranger, and wherein a stranger is an object not registered in a database of known objects; and changing a state of the object from the confirmed state to a non-confirmed state based on the object identifier for the object not matching the object identifier of the previously detected object and based on the confidence score for the object being greater than the minimum confidence threshold. In some aspects, the methods, apparatuses, and computer-readable medium described above further comprise changing a priority for the object to a base priority associated with the non-confirmed state in response to changing the state of the object from the confirmed state to the non-confirmed state, wherein the base priority associated with the non-confirmed state is higher than a base priority associated with the confirmed state.

In some aspects, the methods, apparatuses, and computer-readable medium described above further comprise: determining an object detected in the current video frame has a confirmed state, the confirmed state indicating a confirmation that object recognition previously performed on the object was successful; determining an object identifier for the object does not match an object identifier of a previously detected object that matches the object in the current video frame; determining a confidence score for the object is less than a minimum confidence threshold, wherein the minimum confidence threshold is used to identify a stranger, and wherein a stranger is an object not registered in a database of known objects; and changing a state of the object from the confirmed state to a pre-stranger state based on the object identifier for the object not matching the object identifier of the previously detected object and based on the confidence score for the object being less than the minimum confidence threshold. In some aspects, the methods, apparatuses, and computer-readable medium described above further comprise changing a priority for the object to a base priority associated with the pre-stranger state in response to changing the state of the object from the confirmed state to the pre-stranger state, wherein the base priority associated with the pre-stranger state is greater than a base priority associated with the confirmed state.

In some aspects, the methods, apparatuses, and computer-readable medium described above further comprise: determining an object detected in the current video frame has a non-confirmed state; determining an object identifier for the object matches an object identifier of a previously detected object that matches the object in the current video frame; determining a confidence score for the object is greater than a first confidence threshold and is less than a second confidence threshold, the first confidence threshold being less than the second confidence threshold; and changing a state of the object from the non-confirmed state to a new state based on the object identifier for the object matching the object identifier of the previously detected object and based on the confidence score for the object being greater than the first confidence threshold and less than the second confidence threshold. In some aspects, the methods, apparatuses, and computer-readable medium described above further comprise changing a priority for the object to a base priority associated with the new state in response to changing the state of the object from the non-confirmed state to the new state, wherein the base priority associated with the new state is greater than a base priority associated with the non-confirmed state.

In some aspects, the methods, apparatuses, and computer-readable medium described above further comprise: determining an object detected in the current video frame has a non-confirmed state; determining a confidence score for the object is greater than a second confidence threshold, wherein the second confidence threshold is used to confirm that object recognition previously performed on the object was successful; and changing a state of the object from the non-confirmed state to a confirmed state based on the confidence score for the object being greater than the second confidence threshold. In some aspects, the methods, apparatuses, and computer-readable medium described above further comprise changing a priority for the object to a base priority associated with the confirmed state in response to changing the state of the object from the non-confirmed state to the confirmed state, wherein the base priority associated with the confirmed state is less than a base priority associated with the non-confirmed state.

In some aspects, the methods, apparatuses, and computer-readable medium described above further comprise: determining an object detected in the current video frame has a non-confirmed state; determining an object identifier for the object does not match an object identifier of a previously detected object that matches the object in the current video frame; and maintaining a state of the object in the non-confirmed state based on the object identifier for the object not matching the object identifier of the previously detected object. In some aspects, the methods, apparatuses, and computer-readable medium described above further comprise increasing a priority for the object by a pre-defined amount in response to the state of the object being maintained in the non-confirmed state.

In some aspects, the methods, apparatuses, and computer-readable medium described above further comprise: determining an object detected in the current video frame has a non-confirmed state; determining a confidence score for the object is less than a minimum confidence threshold, wherein the minimum confidence threshold is used to identify a stranger, and wherein a stranger is an object not registered in a database of known objects; and changing a state of the object from the non-confirmed state to a pre-stranger state based on the confidence score for the object being less than the minimum confidence threshold. In some aspects, the methods, apparatuses, and computer-readable medium described above further comprise changing a priority for the object to a base priority associated with the pre-stranger state in response to changing the state of the object from the non-confirmed state to the pre-stranger state, wherein the base priority associated with the pre-stranger state is less than a base priority associated with the non-confirmed state.

In some aspects, the methods, apparatuses, and computer-readable medium described above further comprise: determining an object detected in the current video frame has a pre-stranger state, wherein a stranger is an object not registered in a database of known objects; determining an object identifier for the object matches an object identifier of a previously detected object that matches the object in the current video frame; determining a confidence score for the object is greater than a first confidence threshold and is less than a second confidence threshold, the first confidence threshold being less than the second confidence threshold; and changing a state of the object from the pre-stranger state to a new state based on the object identifier for the object matching the object identifier of the previously detected object and based on the confidence score for the object being greater than the first confidence threshold and less than the second confidence threshold. In some aspects, the methods, apparatuses, and computer-readable medium described above further comprise changing a priority for the object to a base priority associated with the new state in response to changing the state of the object from the pre-stranger state to the new state, wherein the base priority associated with the new state is greater than a base priority associated with the pre-stranger state.

In some aspects, the methods, apparatuses, and computer-readable medium described above further comprise: determining an object detected in the current video frame has a pre-stranger state, wherein a stranger is an object not registered in a database of known objects; determining an object identifier for the object matches an object identifier of a previously detected object that matches the object in the current video frame; determining a confidence score for the object is greater than a minimum confidence threshold and is less than a first confidence threshold, the minimum confidence threshold being less than the first confidence threshold; and changing a state of the object from the pre-stranger state to a non-confirmed state based on the object identifier for the object matching the object identifier of the previously detected object and based on the confidence score for the object being greater than the minimum confidence threshold and less than the first confidence threshold. In some aspects, the methods, apparatuses, and computer-readable medium described above further comprise changing a priority for the object to a base priority associated with the non-confirmed state in response to changing the state of the object from the pre-stranger state to the non-confirmed state, wherein the base priority associated with the non-confirmed state is greater than a base priority associated with the pre-stranger state.

In some aspects, the methods, apparatuses, and computer-readable medium described above further comprise: determining an object detected in the current video frame has a pre-stranger state, wherein a stranger is an object not registered in a database of known objects; determining an object identifier for the object matches an object identifier of a previously detected object that matches the object in the current video frame; determining a confidence score for the object is less than a minimum confidence threshold, wherein the minimum confidence threshold is used to identify a stranger; determining a history counter for the object is less than a minimum counter threshold, the minimum counter threshold including a count of a number of video frames the confidence score for the object is less than the minimum confidence threshold; and maintaining a state of the object in the pre-stranger state based on the object identifier for the object matching the object identifier of the previously detected object, based on the confidence score for the object being less than the minimum confidence threshold, and based on the history counter for the object being less than the minimum counter threshold. In some aspects, the methods, apparatuses, and computer-readable medium described above further comprise increasing a priority for the object by a pre-defined amount in response to the state of the object being maintained in the pre-stranger state.

In some aspects, the methods, apparatuses, and computer-readable medium described above further comprise: determining an object detected in the current video frame has a pre-stranger state, wherein a stranger is an object not registered in a database of known objects; determining an object identifier for the object matches an object identifier of a previously detected object that matches the object in the current video frame; determining a confidence score for the object is less than a minimum confidence threshold, wherein the minimum confidence threshold is used to identify a stranger; determining a history counter for the object is greater than a minimum counter threshold, the minimum counter threshold including a count of a number of video frames the confidence score for the object is less than the minimum confidence threshold; and changing a state of the object from the pre-stranger state to a stranger state based on the object identifier for the object matching the object identifier of the previously detected object, based on the confidence score for the object being less than the minimum confidence threshold, and based on the history counter for the object being greater than the minimum counter threshold. In some aspects, the methods, apparatuses, and computer-readable medium described above further comprise changing a priority for the object to a base priority associated with the stranger state in response to changing the state of the object from the pre-stranger state to the stranger state, wherein the base priority associated with the stranger state is less than a base priority associated with the pre-stranger state.

In some aspects, the methods, apparatuses, and computer-readable medium described above further comprise: determining an object detected in the current video frame has a stranger state, wherein a stranger is an object not registered in a database of known objects; determining an object identifier for the object matches an object identifier of a previously detected object that matches the object in the current video frame; determining a confidence score for the object is greater than a first confidence threshold and is less than a second confidence threshold, the first confidence threshold being less than the second confidence threshold; determining a history counter for the object is greater than a first counter threshold, the first counter threshold including a count of a number of video frames the confidence score for the object is greater than the first confidence threshold; and changing a state of the object from the stranger state to a new state based on the object identifier for the object matching the object identifier of the previously detected object, based on the confidence score for the object being greater than the first confidence threshold and less than the second confidence threshold, and based on the history counter for the object being greater than the first counter threshold. In some aspects, the methods, apparatuses, and computer-readable medium described above further comprise changing a priority for the object to a base priority associated with the new state in response to changing the state of the object from the stranger state to the new state, wherein the base priority associated with the new state is greater than a base priority associated with the stranger state.

In some aspects, the methods, apparatuses, and computer-readable medium described above further comprise: determining an object detected in the current video frame has a stranger state, wherein a stranger is an object not registered in a database of known objects; determining an object identifier for the object matches an object identifier of a previously detected object that matches the object in the current video frame; determining a confidence score for the object is greater than a minimum confidence threshold and is less than a first confidence threshold, the minimum confidence threshold being less than the first confidence threshold; and changing a state of the object from the stranger state to a pre-stranger state based on the object identifier for the object matching the object identifier of the previously detected object and based on the confidence score for the object being greater than the minimum confidence threshold and less than the first confidence threshold. In some aspects, the methods, apparatuses, and computer-readable medium described above further comprise changing a priority for the object to a base priority associated with the pre-stranger state in response to changing the state of the object from the stranger state to the pre-stranger state, wherein the base priority associated with the pre-stranger state is greater than a base priority associated with the stranger state.

In some aspects, the methods, apparatuses, and computer-readable medium described above further comprise: determining an object detected in the current video frame has a stranger state, wherein a stranger is an object not registered in a database of known objects; determining an object identifier for the object matches an object identifier of a previously detected object that matches the object in the current video frame; determining a confidence score for the object is less than a minimum confidence threshold, wherein the minimum confidence threshold is used to identify a stranger; and maintaining a state of the object in the stranger state based on the object identifier for the object matching the object identifier of the previously detected object and based on the confidence score for the object being less than the minimum confidence threshold. In some aspects, the methods, apparatuses, and computer-readable medium described above further comprise increasing a priority for the object by a pre-defined amount in response to the state of the object being maintained in the stranger state.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 6 is a diagram illustrating examples of state transitions, in accordance with some examples.

FIG. 7 is a diagram illustrating examples of base priorities for different states, in accordance with some examples.

DETAILED DESCRIPTION

Figure 1:
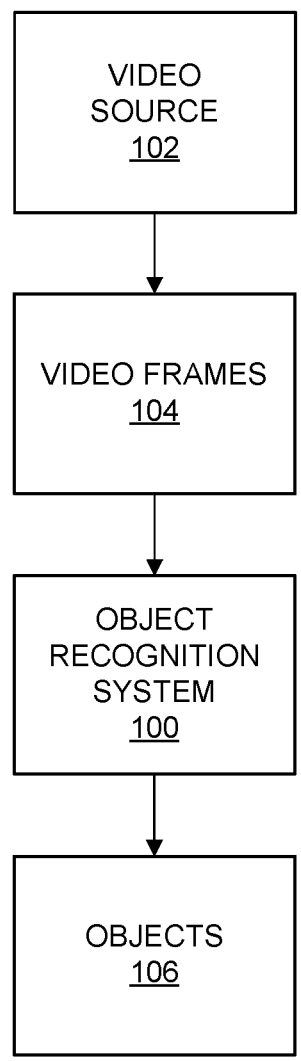
FIG. 1 is a block diagram illustrating an example of system for recognizing objects in one or more video frames, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a sequence of video frames from a video source and can process the video sequence to perform a variety of tasks. One example of a video source can include an Internet protocol camera (IP camera) or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and can send an alert or alarm to a central control room to alert a user of the event of interest.

As described in more detail herein, object recognition systems and methods can detect, track, and, in some cases, recognize objects in one or more video frames that capture images of a scene. Objects can be assigned priorities, and can be recognized using a full object recognition process based on the assigned priorities. For example, a method of dynamic priority-based face recognition is provided. A detected face (or other suitable object) is tracked over a sequence of frames based on face detection. The bounding box (or other suitable bounding region) of a detected face (or other object) can be matched with all the faces detected in the previous frame, and the best matched face (e.g., with an intersection over union of the bounding boxes is greater than a threshold, or using another matching technique) will be successfully tracked. Each tracked face can be associated with a recognition priority, a face state, and a unique person identifier. A face with higher priority will be processed earlier than a face with lower priority. The priority is updated with a set of rules that are based on various factors. Details of an example object recognition system are described below with respect to FIG. 1 and FIG. 2.

FIG. 1 is a block diagram illustrating an example of a system for recognizing objects in one or more video frames. The object recognition system 100 receives video frames 104 from a video source 102. The video frames 104 can also be referred to herein as video pictures or pictures. The video frames 104 capture or contain images of a scene, and can be part of one or more video sequences. The video source 102 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 102 can include an IP camera or multiple IP cameras. In an illustrative example, multiple IP cameras can be located throughout a scene or environment, and can provide the video frames 104 to the object recognition system 100. For instance, the IP cameras can be placed at various fields of view within the scene so that surveillance can be performed based on the captured video frames 104 of the scene. The object detection techniques described herein can also be performed on images other than those captured by video frames, such as still images captured by a camera or other suitable images.

In some embodiments, the object recognition system 100 and the video source 102 can be part of the same computing device. In some embodiments, the object recognition system 100 and the video source 102 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The object recognition system 100 processes the video frames 104 to detect and track objects in the video frames 104. In some cases, the objects can also be recognized by comparing features of the detected and/or tracked objects with enrolled objects that are registered with the object recognition system 100. As described in more detail herein, the objects can be recognized at each video frame based on a priorities assigned to the objects at each video frame. Objects having higher priorities are processed using object recognition before objects having lower priorities. The object recognition system 100 outputs objects 106 as detected and tracked objects and/or as recognized objects.

Any type of object recognition can be performed by the object recognition system 100. An example of object recognition includes face recognition, where faces of people in a scene captured by video frames are analyzed and detected, tracked, and/or recognized using the techniques described herein. An example face recognition process identifies and/or verifies an identity of a person from a digital image or a video frame of a video clip. In some cases, the features of the face are extracted from the image and compared with features of known faces stored in a database. In some cases, the extracted features are fed to a classifier and the classifier can give the identity of the input features. One illustrative example of a method for recognizing a face includes performing face detection, face tracking, facial landmark detection, face normalization, feature extraction, and face identification and/or face verification. Face detection is a kind of object detection and the only object to be detected is face. While techniques are described herein using face recognition as an illustrative example of object recognition, one of ordinary skill will appreciate that the same techniques can apply to recognition of other types of objects.

Figure 2:
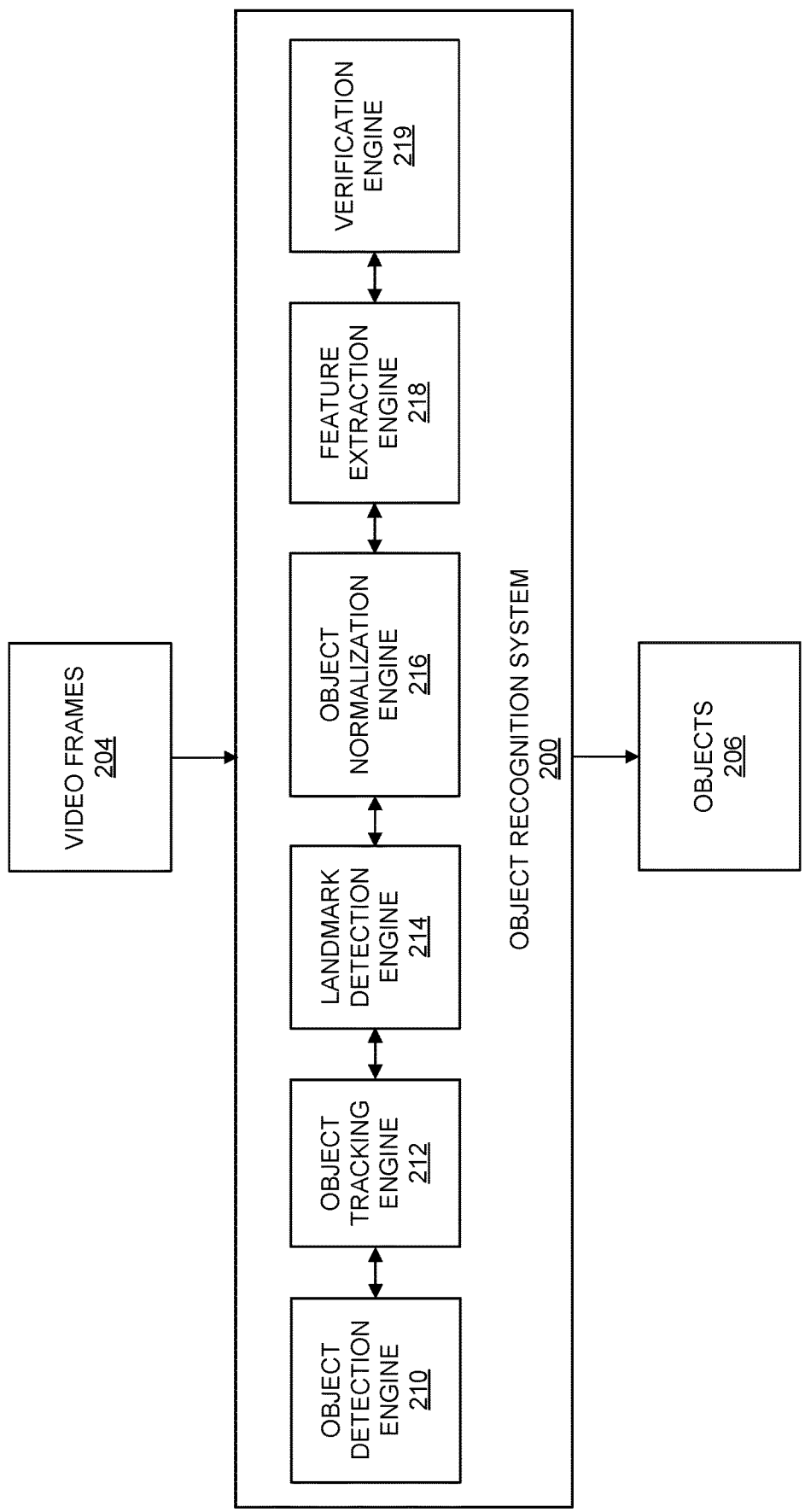
FIG. 2 is an example of an object recognition system, in accordance with some examples.

FIG. 2 is a block diagram illustrating an example of an object recognition system 200. The object recognition system 200 processes video frames 204 and outputs objects 206 as detected, tracked, and/or recognized objects. The object recognition system 200 can perform any type of object recognition. An example of object recognition performed by the object recognition system 200 includes face recognition. However, one of ordinary skill will appreciate that any other suitable type of object recognition can be performed by the object recognition system 200. One example of a full face recognition process for recognizing objects in the video frames 204 includes the following steps: object detection; object tracking; object landmark detection; object normalization; feature extraction; and identification and/or verification. Object recognition can be performed using some or all of these steps, with some steps being optional in some cases.

The object recognition system 200 includes an object detection engine 210 that can perform object detection. In one illustrative example, the object detection engine 210 can perform face detection to detect one or more faces in a video frame. Object detection is a technology to identify objects from an image or video frame. For example, face detection can be used to identify faces from an image or video frame. Many object detection algorithms (including face detection algorithms) use template matching techniques to locate objects (e.g., faces) from the images. Various types of template matching algorithms can be used. In other object detection algorithm can also be used by the object detection engine 210.

One example template matching algorithm contains four steps, including Haar feature extraction, integral image generation, Adaboost training, and cascaded classifiers. Such an object detection technique performs detection by applying a sliding window across a frame or image. For each current window, the Haar features of the current window are computed from an Integral image, which is computed beforehand. The Haar features are selected by an Adaboost algorithm and can be used to classify a window as a face (or other object) window or a non-face window effectively with a cascaded classifier. The cascaded classifier includes many classifiers combined in a cascade, which allows background regions of the image to be quickly discarded while spending more computation on object-like regions. For example, the cascaded classifier can classify a current window into a face category or a non-face category. If one classifier classifies a window as a non-face category, the window is discarded. Otherwise, if one classifier classifies a window as a face category, a next classifier in the cascaded arrangement will be used to test again. Until all the classifiers determine the current window is a face, the window will be labeled as a candidate of face. After all the windows are detected, a non-max suppression algorithm is used to group the face windows around each face to generate the final result of detected faces. Further details of such an object detection algorithm is described in P. Viola and M. Jones, "Robust real time object detection," IEEE ICCV Workshop on Statistical and Computational Theories of Vision, 2001, which is hereby incorporated by reference, in its entirety and for all purposes.

Other suitable object detection techniques could also be performed by the object detection engine 210. One illustrative example of object detection includes an example-based learning for view-based face detection, such as that described in K. Sung and T. Poggio, "Example-based learning for view-based face detection," IEEE Patt. Anal. Mach. Intell., volume 20, pages 39-51, 1998, which is hereby incorporated by reference, in its entirety and for all purposes. Another example is neural network-based object detection, such as that described in H. Rowley, S. Baluja, and T. Kanade, "Neural network-based face detection," IEEE Patt. Anal. Mach. Intell., volume 20, pages 22-38, 1998, which is hereby incorporated by reference, in its entirety and for all purposes. Yet another example is statistical-based object detection, such as that described in H. Schneiderman and T. Kanade, "A statistical method for 3D object detection applied to faces and cars," International Conference on Computer Vision, 2000, which is hereby incorporated by reference, in its entirety and for all purposes. Another example is a snowbased object detector, such as that described in D. Roth, M. Yang, and N. Ahuja, "A snowbased face detector," Neural Information Processing 12, 2000, which is hereby incorporated by reference, in its entirety and for all purposes. Another example is a joint induction object detection technique, such as that described in Y. Amit, D. Geman, and K. Wilder, "Joint induction of shape features and tree classifiers," 1997, which is hereby incorporated by reference, in its entirety and for all purposes. Any other suitable image-based object detection technique can be used.

The object recognition system 200 further includes an object tracking engine 212 that can perform object tracking for one or more of the objects detected by the object detection engine 210. In one illustrative example, the object detection engine 212 can track faces detected by the object detection engine 210. Object tracking includes tracking objects across multiple frames of a video sequence or a sequence of images. For instance, face tracking is performed to track faces across frames or images. The full object recognition process (e.g., a full face recognition process) is time consuming and resource intensive, and thus it is sometimes not realistic to recognize all objects (e.g., faces) for every frame, such as when numerous faces are captured in a current frame. In order to reduce the time and resources needed for object recognition, object tracking techniques can be used to track previously recognized faces. For example, if a face has been recognized and the object recognition system 200 is confident of the recognition results (e.g., a high confidence score is determined for the recognized face), the object recognition system 200 can skip the full recognition process for the face in one or several subsequent frames if the face can be tracked successfully by the object tracking engine 212.

Any suitable object tracking technique can be used by the object tracking engine 212. One example of a face tracking technique includes a key point technique. The key point technique includes detecting some key points from a detected face (or other object) in a previous frame. For example, the detected key points can include significant corners on face, such as facial landmarks (described in more detail below). The key points can be matched with features of objects in a current frame using template matching. As used herein, a current frame refers to a frame currently being processed. Examples of template matching methods can include optical flow, local feature matching, and/or other suitable techniques. In some cases, the local features can be histogram of gradient, local binary pattern (LBP), or other features. Based on the tracking results of the key points between the previous frame and the current frame, the faces in the current frame that match faces from a previous frame can be located.

Figure 3:
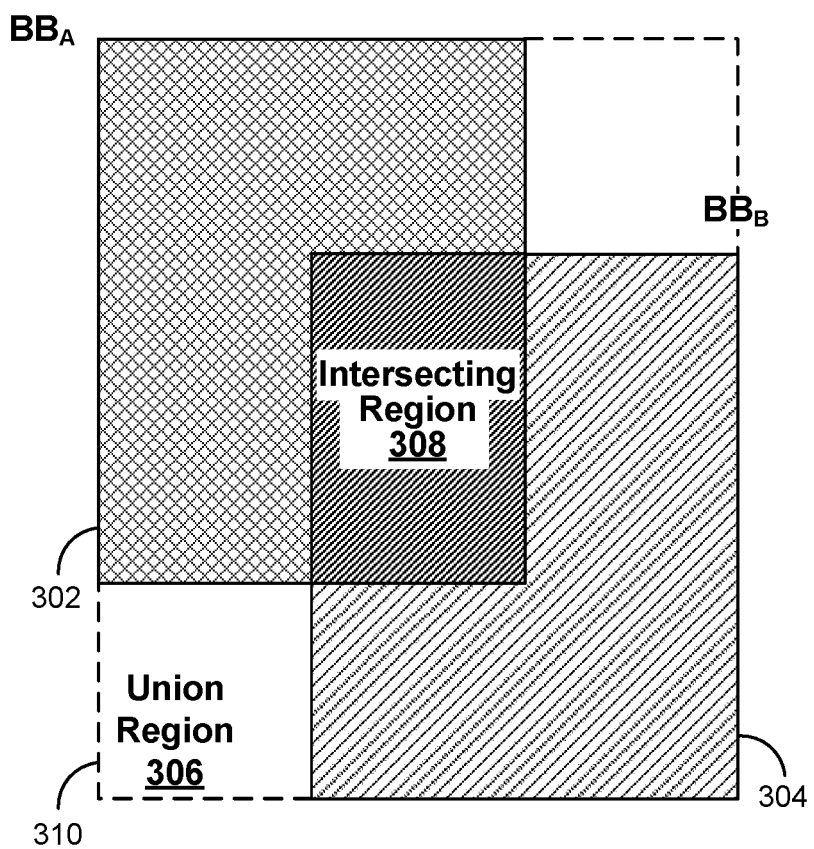
FIG. 3 is a diagram illustrating an example of an intersection and union of two bounding boxes, in accordance with some examples.

Another example object tracking technique is based on the face detection results. For example, the intersection over union (IOU) of face bounding boxes can be used to determine if a face detected in the current frame matches a face detected in the previous frame. FIG. 3 is a diagram showing an example of an intersection I and union U of two bounding boxes, including bounding box $BB_A$ 302 of an object in a current frame and bounding box $BB_B$ 304 of an object in the previous frame. The intersecting region 308 includes the overlapped region between the bounding box $BB_A$ 302 and the bounding box $BB_B$ 304.

The union region 306 includes the union of bounding box $BB_A$ 302 and bounding box $BB_B$ 304. The union of bounding box $BB_A$ 302 and bounding box $BB_B$ 304 is defined to use the far corners of the two bounding boxes to create a new bounding box 310 (shown as dotted line). More specifically, by representing each bounding box with (x, y, w, h), where (x, y) is the upper-left coordinate of a bounding box, w and h are the width and height of the bounding box, respectively, the union of the bounding boxes would be represented as follows:

$$\text{Union}(BB_1, BB_2) = (\min(x_1, x_2), \min(y_1, y_2), (\max(x_1 + w_1 - 1, x_2 + w_2 - 1) - \min(x_1, x_2)), (\max(y_1 + h_1 - 1, y_2 + h_2 - 1) - \min(y_1, y_2)))$$

Using FIG. 3 as an example, the first bounding box 302 and the second bounding box 304 can be determined to match for tracking purposes if an overlapping area between the first bounding box 302 and the second bounding box 304 (the intersecting region 308) divided by the union 310 of the bounding boxes 302 and 304 is greater than an IOU threshold (denoted as $$T_{IOU} < \frac{\text{Area of Intersecting Region 308}}{\text{Area of Union 310}}\Bigr).$$

The IOU threshold can be set to any suitable amount, such as 50%, 60%, 70%, 75%, 80%, 90%, or other configurable amount. In one illustrative example, the first bounding box 302 and the second bounding box 304 can be determined to be a match when the IOU for the bounding boxes is at least 70%. The object in the current frame can be determined to be the same object from the previous frame based on the bounding boxes of the two objects being determined as a match.

In another example, an overlapping area technique can be used to determine a match between bounding boxes. For instance, the first bounding box 302 and the second bounding box 304 can be determined to be a match if an area of the first bounding box 302 and/or an area the second bounding box 304 that is within the intersecting region 308 is greater than an overlapping threshold. The overlapping threshold can be set to any suitable amount, such as 50%, 60%, 70%, or other configurable amount. In one illustrative example, the first bounding box 302 and the second bounding box 304 can be determined to be a match when at least 65% of the bounding box 302 or the bounding box 304 is within the intersecting region 308.

In some implementations, the key point technique and the IOU technique (or the overlapping area technique) can be combined to achieve even more robust tracking results. Any other suitable object tracking (e.g., face tracking) techniques can be used. Using any suitable technique, face tracking can reduce the face recognition time significantly, which in turn can save CPU bandwidth and power.

The landmark detection engine 214 can perform object landmark detection. For example, the landmark detection engine 214 can perform facial landmark detection for face recognition. Facial landmark detection can be an important step in face recognition. For instance, object landmark detection can provide information for object tracking (as described above) and can also provide information for face normalization (as described below). A good landmark detection algorithm can improve the face recognition accuracy significantly, as well as the accuracy of other object recognition processes.

One illustrative example of landmark detection is based on a cascade of regressors method. Using such a method in face recognition, for example, a cascade of regressors can be learned from faces with labeled landmarks. A combination of the outputs from the cascade of the regressors provides accurate estimation of landmark locations. The local distribution of features around each landmark can be learned and the regressors will give the most probable displacement of the landmark from the previous regressor's estimate. Further details of a cascade of regressors method is described in V. Kazemi and S. Josephine, "One millisecond face alignment with an ensemble of regression trees," CVPR, 2014, which is hereby incorporated by reference, in its entirety and for all purposes. Any other suitable landmark detection techniques can also be used by the landmark detection engine 214.

The object recognition system 200 further includes an object normalization engine 216 for performing object normalization. Object normalization can be performed to align objects for better object recognition results. For example, the object normalization engine 216 can perform face normalization by processing an image to align and/or scale the faces in the image for better recognition results. One example of a face normalization method uses two eye centers as reference points for normalizing faces. The face image can be translated, rotated, and scaled to ensure the two eye centers are located at the designated location with a same size. A similarity transform can be used for this purpose. Another example of a face normalization method can use five points as reference points, including two centers of the eyes, two corners of the mouth, and a nose tip. In some cases, the landmarks used for reference points can be determined from facial landmark detection.

In some cases, the illumination of the face images may also need to be normalized. One example of an illumination normalization method is local image normalization. With a sliding window be applied to an image, each image patch is normalized with its mean and standard deviation. The center pixel value is subtracted from the mean of the local patch and then divided by the standard deviation of the local patch. Another example method for lighting compensation is based on discrete cosine transform (DCT). For instance, the second coefficient of the DCT can represent the change from a first half signal to the next half signal with a cosine signal. This information can be used to compensate a lighting difference caused by side light, which can cause part of a face (e.g., half of the face) to be brighter than the remaining part (e.g., the other half) of the face. The second coefficient of the DCT transform can be removed and an inverse DCT can be applied to get the left-right lighting normalization.

The feature extraction engine 218 performs feature extraction, which is an important part of the object recognition process. An example of a feature extraction process is based on steerable filters. A steerable filter-based feature extraction approach operates to synthesize filters using a set of basis filters. For instance, the approach provides an efficient architecture to synthesize filters of arbitrary orientations using linear combinations of basis filters. Such a process provides the ability to adaptively steer a filter to any orientation, and to determine analytically the filter output as a function of orientation. In one illustrative example, a two-dimensional (2D) simplified circular symmetric Gaussian filter can be represented as:

$$G(x,y) = e^{-(x^2+y^2)},$$

where x and y are Cartesian coordinates, which can represent any point, such as a pixel of an image or video frame. The n-th derivative of the Gaussian is denoted as $G_n$, and the notation $(\ldots)^\theta$ represents the rotation operator. For example, $f^\theta(x, y)$ is the function $f(x, y)$ rotated through an angle $\theta$ about the origin. The x derivative of $G(x,y)$ is:

$$G_1^{0°} = \frac{\partial}{\partial x} G(x, y) = -2xe^{-(x^2+y^2)},$$

and the same function rotated 90° is:

$$G_1^{90°} = \frac{\partial}{\partial y} G(x, y) = -2ye^{-(x^2+y^2)},$$

where $G_1^{0°}$ and $G_1^{90°}$ are called basis filters since $G_1^\theta$ can be represented as $G_1^\theta = \cos(\theta) G_1^{0°} + \sin(\theta) G_1^{90°}$ and $\theta$ is arbitrary angle, indicating that $G_1^{0°}$ and $G_1^{90°}$ span the set of $G_1^\theta$ filters (hence, basis filters). Therefore, $G_1^{0°}$ and $G_1^{90°}$ can be used to synthesize filters with any angle. The $\cos(\theta)$ and $\sin(\theta)$ terms are the corresponding interpolation functions for the basis filters.

Steerable filters can be convolved with face images to produce orientation maps which in turn can be used to generate features (represented by feature vectors). For instance, because convolution is a linear operation, the feature extraction engine 218 can synthesize an image filtered at an arbitrary orientation by taking linear combinations of the images filtered with the basis filters $G_1^{0°}$ and $G_1^{90°}$. In some cases, the features can be from local patches around selected locations on detected faces (or other objects). Steerable features from multiple scales and orientations can be concatenated to form an augmented feature vector that represents a face image (or other object). For example, the orientation maps from $G_1^{0°}$ and $G_1^{90°}$ can be combined to get one set of local features, and the orientation maps from $G_1^{45°}$ and $G_1^{135°}$ can be combined to get another set of local features. In one illustrative example, the feature extraction engine 218 can apply one or more low pass filters to the orientation maps, and can use energy, difference, and/or contrast between orientation maps to obtain a local patch. A local patch can be a pixel level element. For example, an output of the orientation map processing can include a texture template or local feature map of the local patch of the face being processed. The resulting local feature maps can be concatenated to form a feature vector for the face image. Further details of using steerable filters for feature extraction are described in William T. Freeman and Edward H. Adelson, "The design and use of steerable filters," IEEE Transactions on Pattern Analysis and Machine Intelligence, 13(9):891-906, 1991, and in Mathews Jacob and Michael Unser, "Design of Steerable Filters for Feature Detection Using Canny-Like Criteria," IEEE Transactions on Pattern Analysis and Machine Intelligence, 26(8):1007-1019, 2004, which are hereby incorporated by reference, in their entirety and for all purposes.

Postprocessing on the feature maps such as LDA/PCA can also be used to reduce the dimensionality of the feature size. In order to compensate the errors in landmark detection, a multiple scale feature extraction can be used to make the features more robust for matching and/or classification.

The verification engine 219 performs object identification and/or object verification. Face identification and verification is one example of object identification and verification. For example, face identification is the process to identify which person identifier a detected and/or tracked face should be associated with, and face verification is the process to verify if the face belongs to the person to which the face is claimed to belong. The same idea also applies to objects in general, where object identification identifies which object identifier a detected and/or tracked object should be associated with, and object verification verifies if the detected/tracked object actually belongs to the object with which the object identifier is assigned. Objects can be enrolled or registered in an enrolled database that contains known objects. For example, an owner of a camera containing the object recognition system 200 can register the owner's face and faces of other trusted users. The enrolled database can be located in the same device as the object recognition system 200, or can be located remotely (e.g., at a remote server that is in communication with the system 200). The database can be used as a reference point for performing object identification and/or object verification. In one illustrative example, object identification and/or verification can be used to authenticate a user to the camera and/or to indicate an intruder or stranger has entered a scene monitored by the camera.

Object identification and object verification present two related problems and have subtle differences. Object identification can be defined as a one-to-multiple problem in some cases. For example, face identification (as an example of object identification) can be used to find a person from multiple persons. Face identification has many applications, such as for performing a criminal search. Object verification can be defined as a one-to-one problem. For example, face verification (as an example of object verification) can be used to check if a person is who they claim to be (e.g., to check if the person claimed is the person in an enrolled database). Face verification has many applications, such as for performing access control to a device, system, or other accessible item.

Using face identification as an illustrative example of object identification, an enrolled database containing the features of enrolled faces can be used for comparison with the features of one or more given query face images (e.g., from input images or frames). The enrolled faces can include faces registered with the system and stored in the database, which contains known faces. A most similar enrolled face can be determined to be a match with a query face image.

The person identifier of the matched enrolled face (the most similar face) is identified as the person to be recognized. In some implementations, similarity between features of an enrolled face and features of a query face can be measured with distance. Any suitable distance can be used, including Cosine distance, Euclidean distance, Manhattan distance, Mahalanobis distance, or other suitable distance. One method to measure similarity is to use matching scores. A matching score represents the similarity between features, where a very high score between two feature vectors indicates that the two feature vectors are very similar. A feature vector for a face can be generated using feature extraction, as described above. In one illustrative example, a similarity between two faces (represented by a face patch) can be computed as the sum of similarities of the two face patches. The sum of similarities can be based on a Sum of Absolute Differences (SAD) between the probe patch feature (in an input image) and the gallery patch feature (stored in the database). In some cases, the distance is normalized to 0 and 1. As one example, the matching score can be defined as 1000*(1−distance).

Another illustrative method for face identification includes applying classification methods, such as a support vector machine to train a classifier that can classify different faces using given enrolled face images and other training face images. For example, the query face features can be fed into the classifier and the output of the classifier will be the person identifier of the face.

For face verification, a provided face image will be compared with the enrolled faces. This can be done with simple metric distance comparison or classifier trained with enrolled faces of the person. In general, face verification needs higher recognition accuracy since it is often related to access control. A false positive is not expected in this case. For face verification, a purpose is to recognize who the person is with high accuracy but with low rejection rate. Rejection rate is the percentage of faces that are not recognized due to the matching score or classification result being below the threshold for recognition.

Metrics can be defined for measuring the performance of object recognition results. For example, in order to measure the performance of face recognition algorithms, it is necessary certain metrics can be defined. Face recognition can be considered as a kind of classification problem. True positive rate and false positive rate can be used to measure the performance. One example is a receiver operating characteristic (ROC). The ROC curve is created by plotting the true positive rate (TPR) against the false positive rate (FPR) at various threshold settings. In a face recognition scenario, true positive rate is defined as the percentage that a person is correctly identified as himself/herself and false positive rate is defined as the percentage that a person is wrongly classified as another person. However, both face identification and verification should use a confidence threshold to determine if the recognition result is valid. In some cases, all faces that are determined to be similar to and thus match one or more enrolled face are given a confidence score. Determined matches with confidence scores that are less than a confidence threshold will be rejected. In some cases, the percentage calculation will not consider the number of faces that are rejected to be recognized due to low confidence. In such cases, a rejection rate should also be considered as another metric, in addition to true positive and false positive rates.

Several problems can arise due to object recognition. For example, as noted above, a full object recognition process can involve several processes, such as face detection, landmark detection, feature extraction, and database matching (for identification and/or verification). Performing such processes is a very time consuming and processor intensive endeavor. It is even more challenging to recognize faces (or other objects) from video frames in real-time (as the video is being received and processed). For instance, it can be unfeasible to recognize faces from video in real-time in an embedded system (e.g., in an embedded camera that performs face recognition) due to the complexity of the face recognition algorithms.

Figure 4:
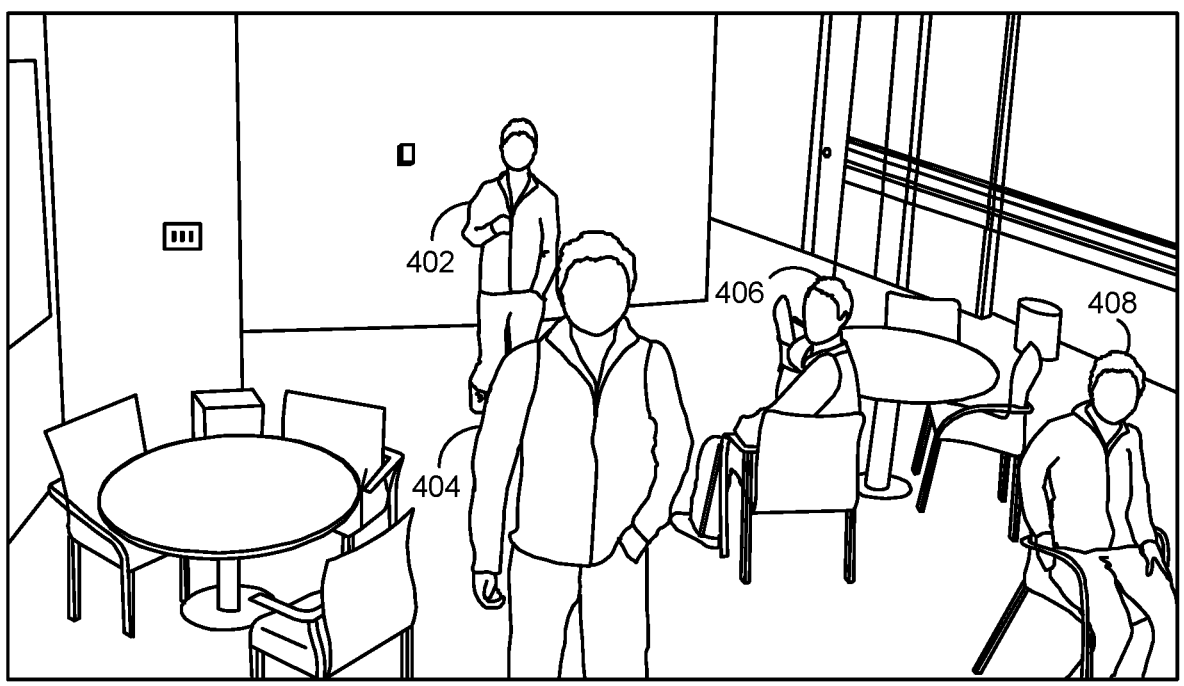
FIG. 4 is an example of a video frame capturing a scene with multiple objects, in accordance with some examples.

In a real-time embedded face recognition system, the complexity of face recognition algorithm makes it difficult and sometimes impossible to recognize all the faces in each frame if there are multiple faces detected in each frame. Video-based face recognition is different from image-based face recognition because information across video frames can provide additional assistance to improve the accuracy of face recognition, and, at the same time, it can also help to improve the efficiency of face recognition. However, how the tracking information across the frames is used to assist in selecting faces for recognition needs to be considered. For instance, problems can arise if multiple faces are located in a scene. FIG. 4 shows an image 400 in which multiple people are present in a scene, including person 402, person 404, person 406, and person 408. If a face recognition system does not consider the tracking information appropriately, the system cannot effectively recognize faces of one or more of the persons 402-408 due to multiple faces being detected in consecutive frames. In some cases, a detected face will not be recognized for a long period of time since the system is busy recognizing other faces. Such a scenario is exacerbated when other faces in the frames cannot be accurately recognized and/or when new faces appear in the scene.

Systems and methods are described herein for efficiently recognizing objects (e.g., faces or other objects) based on dynamically determined priorities assigned to the objects. The methods can be implemented by the object recognition system 200. Tracking information can be used to dynamically prioritize objects so that object recognition can be performed for those objects that should be recognized first based on the dynamically determined priorities. For example, to solve the problem of recognizing multiple objects in a scene, the object recognition system 200 can perform object recognition on one or more objects (e.g., faces) in each video frame based on priorities assigned to the objects, and can track the other objects that are not processed by object recognition. Using such systems and methods, object recognition (e.g., face recognition) can achieve real-time performance with high accuracy. As used herein, the term "real-time" refers to recognizing objects in a video sequence as the video sequence is being captured.

The priority-based techniques described herein can apply to any type of object recognition. One example of object recognition that will be described herein for illustrative purposes includes face recognition, as described above with respect to FIG. 1 and FIG. 2. While examples are described herein using face recognition for illustrative purposes, one of ordinary skill will appreciate that the same techniques can apply to recognition of other types of objects.

For example, the object recognition system 200 can perform dynamic priority-based face recognition for images, such as frames of a video sequence. The object recognition system 200 can recognize one or more faces in a current video frame based on priorities assigned to the objects, and can track the other faces that are not recognized in the current frame. A face that is tracked, but not recognized, in a given frame can be assigned a person identifier and a confidence score from a previous frame for which recognition has been performed for the face. A face is tracked over a sequence of video frames based on face detection. For instance, the object tracking engine 212 can compare a bounding box of a face detected in a current frame against all the faces detected in the previous frame to determine similarities between the detected face and the previously detected faces. The previously detected face that is determined to be the best match is then selected as the face that will be tracked based on the currently detected face. For example, the face detected in the current frame can be assigned the same unique tracking identifier as that assigned to the previously detected face in the previous frame (the face that is matched to the face in the current frame). In some cases, the best matched face can be one that has an intersection over union (between the bounding box of the detected face and the bounding box of the previously detected face) that is greater than a threshold. The best matched face will then be successfully tracked. Other tracking techniques could also be used, such as those described above with respect to FIG. 2.

Figure 5A:
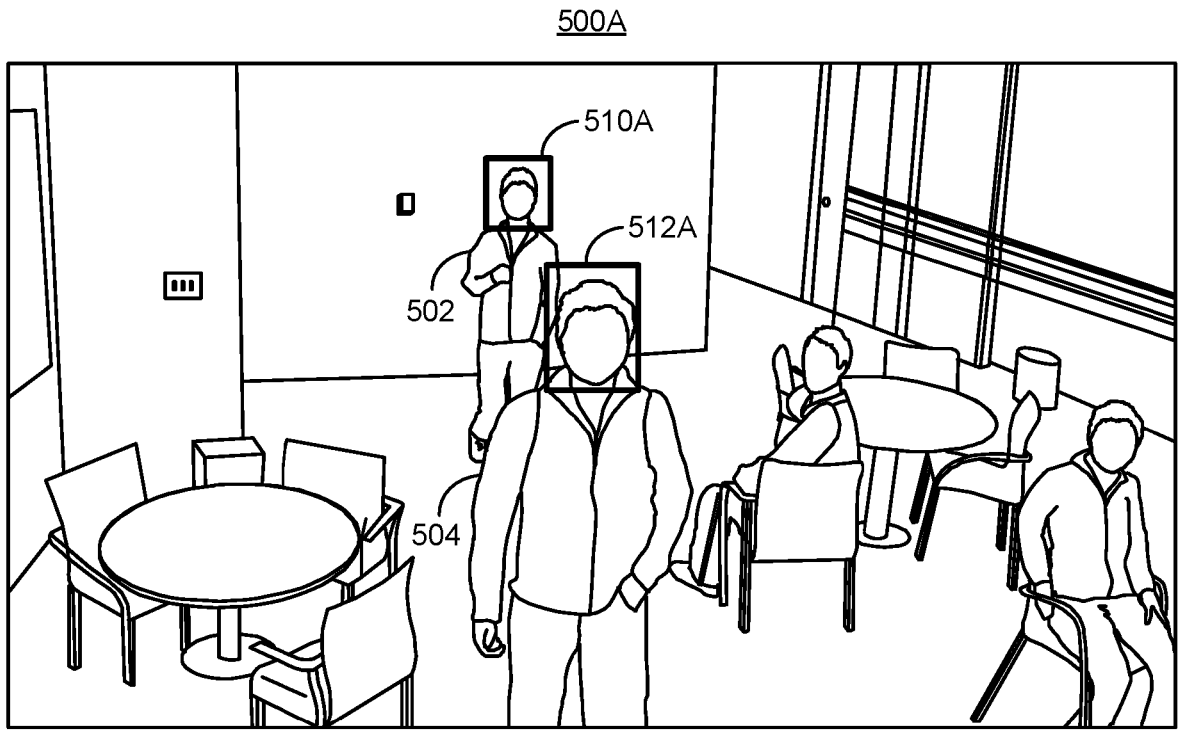
FIG. 5A is an example of a video frame showing detected objects within a scene being tracked, in accordance with some examples.
Figure 5B:
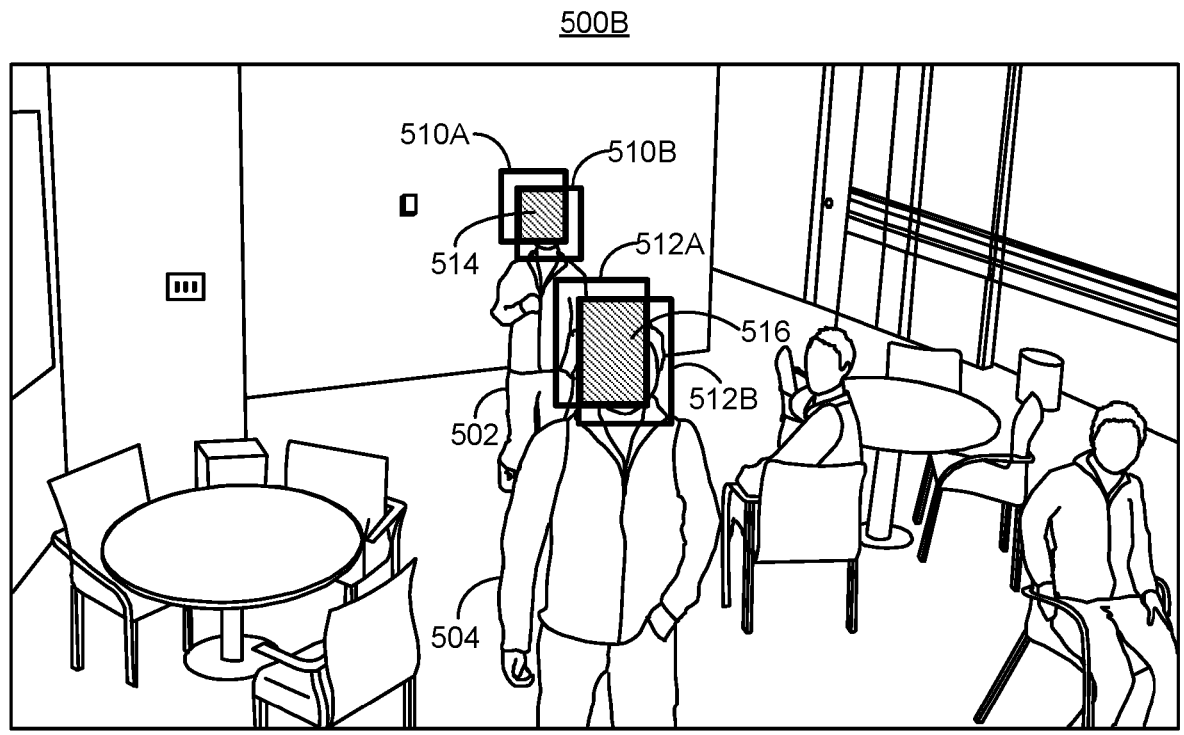
FIG. 5B is an example of a video frame showing detected objects within a scene being tracked, in accordance with some examples.

FIG. 5A and FIG. 5B include video frames 500A and 500B. The video frames 500A and 500B illustrate two frames of a video sequence capturing images of a scene. The multiple faces in the scene captured by the video sequence can be detected and tracked across the frames of the video sequence, including frames 500A and 500B. The frame 500A can be referred to as a previous frame and the frame 500B can be referred to as a current frame.

As shown in FIG. 5A, the face of the person 502 is detected from the frame 500A and the location of the face is represented by the bounding box 510A. The face of the person 504 is detected from the frame 500A and the location of the face is represented by the bounding box 512A. As shown in FIG. 5B, the face of the person 502 is detected from the frame 500B and the location of the face is represented by the bounding box 510B. Similarly, the face of the person 504 is detected from the frame 500B and its location is represented by the bounding box 512B. The object detection techniques described above can be used to detect the faces.

The persons 502 and 504 are tracked across the video frames 500A and 500B by assigning a unique tracking identifier to each of the bounding boxes. A bounding box in the current frame 500B that matches a previous bounding box from the previous frame 500A can be assigned the unique tracking identifier that was assigned to the previous bounding box. In this way, the face represented by the bounding boxes can be tracked across the frames of the video sequence. For example, as shown in FIG. 5B, the current bounding box 510B in the current frame 500B is matched to the previous bounding box 510A from the previous frame 500A based on a spatial relationship between the two bounding boxes 510A and 510B and/or based on features of the faces. In one illustrative example, as described above, an intersection over union (IOU) approach can be used, in which case the current bounding box 510B and the previous bounding box 510A can be determined to match if the intersecting region 514 (also called an overlapping area) divided by a union of the bounding boxes 510A and 510B is greater than an IOU threshold. The IOU threshold can be set to any suitable amount, such as 70% or other configurable amount. In another example, an overlapping area technique can be used, in which case the current bounding box 510B and the previous bounding box 510A can be determined to be a match if at least a threshold amount of the area of the bounding box 510B and/or the area the bounding box 510A is within the intersecting region 514. The overlapping threshold can be set to any suitable amount, such as 70% or other configurable amount. In some cases, the key point technique described above could also be used, in which case key points are matched with features of the faces in the current frame using template matching. Similar techniques can be used to match the current bounding box 512B with the previous bounding box 512A (e.g., based on the intersecting region 516, based on key points, or the like).

Each face (or other object) can be associated with an associated recognition priority, a face state, and a unique person identifier. For instance, as noted above, a location can be maintained for a face detected by the face recognition system 200. The location of a detected face can be represented by a bounding box associated with the face. In one illustrative example, a location of a bounding box of a tracked face can be identified by a center point (or centroid) of the bounding box, and by a width and height of the bounding box. Other points and dimensions of a bounding box could also be used to represent the location of the bounding box and the associated face, such as a corner point of the bounding box and a diagonal from one corner to another corner, or any other suitable points and dimensions.

As also noted above, a tracked face can be associated with a tracking identifier. A unique person identifier can also be associated with a face that has been recognized in one or more frames. The person identifier assigned to a face is used to identify the person that the face is recognized as. In some cases, a face that is tracked, but not recognized, in a given frame can be assigned a unique person identifier and confidence score from the face in a previous frame for which recognition has been performed. For example, if a face is recognized in previous frame and is assigned a unique person identifier and confidence score based on the object recognition process, and the face is tracked (but not recognized) in a current frame, the unique identifier and confidence score previously assigned to the face will be used for the face in the current frame. In some examples, if a face has been recognized before in one or more previous frames, the highest confidence score that has been determined for the face can be kept for the face. In some cases, a face in a frame should be tracked and assigned a tracking identifier during the tracking period until the face disappears from the scene, regardless of whether the face is recognized or not. In some cases, if a face has not yet been recognized in any video frame, the confidence score for the face can be set to 0. In such cases, the face is still tracked and associated with a tracking identifier.

At a current video frame, the detected and tracked faces can be prioritized for an object recognition process that will be applied for a current video frame. For example, a recognition priority P can be allocated to each tracked face. The object recognition process can then be performed on the objects having the highest priorities. For example, a face with higher priority will be processed by the face recognition process earlier than a face with lower priority, while faces with lower priorities will be recognized after higher priority faces or will not be recognized in the current frame. The priority for each face can be determined and/or updated using a set of rules. The set of rules can be based on states determined for the faces. For example, a priority assigned to a face in a current frame is associated with the state determined for the face for the current frame. A state machine can be designed for performing state transitions between frames. For instance, the state machine can be designed to update states for the tracked faces so that face recognition is performed efficiently and robustly. The state machine can be implemented by the object recognition system 200 or other suitable object recognition system.

The states can be determined based on the results of object tracking and/or recognition performed for each video frame. For example, a state of a face can be determined for a current video frame based on a previous state of the face in one or more previous video frames, based on a unique person identifier associated with the face in the current video frame, based on a confidence score for the face determined from a previous object recognition process performed for the face, and/or based on a history counter assigned to the face. A history counter for a face counts the number of times (e.g., the number of frames) the face has been in a certain state and/or the number of times (e.g., the number of frames) the face has been recognized with a confidence score above or below one or more confidence thresholds.

The states assigned to the faces can include a new state, a confirmed state, a non-confirmed state (also referred to as the not-confirmed state), a pre-stranger state, and a stranger state. The new state can be assigned to a face that is not matched to any previously detected and/or tracked face. A face can also be assigned the new state when a unique person identifier of the face matches a unique person identifier of a face detected and tracked in a previous frame and when other conditions are met. The other conditions can be based on the confidence score and/or the history counter of the face. A face can be assigned a confirmed state when the confidence score of the face is higher than a high confidence threshold, indicating that there is a high confidence that the face matches a face registered in an enrolled database of known objects (e.g., objects enrolled with the object recognition system). The non-confirmed state can be assigned to a face that has an identifier mismatch between the unique person identifier of the face in the current video frame and a unique person identifier of a previous face in a previous video frame that is matched to the face for the current video frame (e.g., based on an Intersection over union between a bounding box of the face and a bounding box of the previous face, based on an overlap between the bounding boxes, or other suitable tracking-based matching technique). In some cases, the non-confirmed state can be assigned based on the confidence score determined for the face.

States can also be assigned based on whether a face exhibits characteristics of a stranger. A face is determined to be a stranger when the face is not registered in an enrolled database of known faces. In some cases, a minimum confidence threshold can be used to identify a stranger. For example, a pre-stranger status can be assigned to a face that has a confidence score below the minimum confidence threshold, but has a history counter value indicating the face has not been detected as a stranger for a threshold number of frames. A stranger status can be assigned to a face that has a confidence score below the minimum confidence threshold and that has a history counter value indicating the face has been detected as a stranger for the threshold number of frames. Other factors can also be used to determine the statuses of faces.

FIG. 6 is a diagram illustrating examples of state transitions performed based on object tracking and/or object recognition performed for video frames. For example, the diagram shown in FIG. 6 indicates the transit conditions of the state machine implemented by the object recognition system 200. As noted above, a newly detected face that cannot be matched to any existing (or previously) tracked faces can be considered as a newly created face tracker with a new state. A counter C of a tracked face is assigned to each face tracker to indicate the number of the frames the face has been in the current state. The term S represents the confidence score of a recognized face. The term T represents a confidence threshold, where $T_0<T_1<T_2$. The term $T_0$ is the confidence threshold defined to confirm a stranger, and can be referred to as a minimum confidence threshold. A stranger is a person that is not enrolled in the enrolled database. The term $T_1$ is the minimum confidence threshold to be used to recognize a person (referred to as a recognized person). A recognized person indicates that the tracked person has a confidence score (e.g., a confidence score from face recognition performed in a previous frame for the face of the person) that is high enough so that face recognition for the person's face can be skipped in the current frame and can be recognized again in a future frame. The term $T_2$ is the confidence threshold that can be used to confirm a person is recognized immediately due to a very high confidence score of matching an enrolled face. The confidence threshold $T_2$ can be referred to as a high confidence threshold. In one illustrative example, the confidence score range can be [0,1000], and the values of $T_0$, $T_1$, and $T_2$ can be set to $T_0=90$, $T_1,=130$, and $T_2=200$.

The term Id represents the unique person identifier for a face recognized in the current frame and Id_pre represents the unique person identifier assigned to a face from a previous face recognition process performed for the face (in a previous frame). If face recognition is not performed for a face in a current frame, a person Id is not assigned to the face in the current frame. In the examples described below with respect to FIG. 6, the Id and Id_pre are compared to make sure the unique person Id is the same for the face across different frames. For example, if the person id is not the same between two frames (Id!=Id_pre), it may be meaningless to process the face further in the current frame using the full face recognition process, in which case the face may only be tracked in the current frame.

The term $C_0$ is a threshold of the count of frames that a face is recognized with a confidence score below $T_0$, and can be referred to as a minimum counter threshold. The term $C_1$ is a threshold (a counter threshold) of the count of frames that a face is recognized with a confidence score above $T_1$.

As shown in FIG. 6, the state of a face can be determined for a current video frame based on a previous state of the face (denoted as State_pre) in one or more previous video frames, based on the unique person identifier (Id) associated with the face in the current video frame (as compared to a unique person Id (Id_pre) of a face in the previous frame that is matched with the face in the current frame), based on a confidence score (S) for the face determined from a previous object recognition process performed for the face, and/or based on a history counter (C) assigned to the face. For example, once tracking is performed for the current video frame, a current face is analyzed with respect to a previous face from the previous frame (corresponding to state_pre) that is matched to the current face (e.g., based on a match between the bounding boxes of the previous face and the current face). Various examples are described below using FIG. 6 as reference. One of ordinary skill will appreciate that the less than ("<") and greater than (">") symbols used herein can be replaced with less than or equal to ("≤") and greater than or equal to ("≥") symbols, respectively, without departing from the scope of this description.

A face that has a new state as its previous state (state_pre) in a previous frame can be maintained in the new state, or can be transitioned in the current frame to the confirmed state, the non-confirmed state, the pre-stranger state, or the stranger state. For example, a face having a state_pre of "new" in a previous frame can be maintained in the new state when the Id of the face in the current frame matches the Id of the face in the previous frame (denoted as Id==Id_pre), when the confidence score (S) for the face in the current frame is greater than (or equal to) the first confidence threshold $T_1$ but less than the second confidence threshold $T_2$ (denoted as $T_1 \leq S < T_2$), and when a history counter (C) for the face is less than a first counter threshold (denoted as $C < C_1$).

In another example, a face having a state_pre of "new" in a previous frame can be transitioned to the confirmed state in the current frame when the confidence score (S) for the face in the current frame is greater than (or equal to) the second confidence threshold $T_2$ (denoted as $S \geq T_2$). As noted above, a confidence score above the confidence threshold $T_2$ confirms a person is recognized as an enrolled person (enrolled or registered in an enrolled database that contains known people) with very high confidence. A "new" face in a previous frame can also be transitioned to the confirmed state in the current frame when the Id of the face in the current frame matches the Id of the face in the previous frame (denoted as Id==Id_pre), when the confidence score (S) for the face in the current frame is greater than (or equal to) the first confidence threshold $T_1$ but less than the second confidence threshold $T_2$ (denoted as $T_1 \leq S < T_2$), and when a history counter for the face is greater than the first counter threshold (denoted as $C > C_1$). Because the history counter (C) for the face is greater than the counter threshold $C_1$ (indicating the face has been recognized with a confidence score above $T_1$ for a sufficient number of frames), the state of the face is transitioned to the confirmed state instead of being maintained in the new state (as was the case when the the history counter (C) for the face is less than the counter threshold $C_1$).

In another example, a face having a state_pre of "new" in a previous frame can be transitioned to the non-confirmed state (not_confirmed) in the current frame when the Id of the face in the current frame is determined not to match the Id of the face in the previous frame (denoted as Id!=Id_pre). For example, a new face is changed to non-confirmed after it is recognized once and the current person Id is not the same as last time. In such cases, the face may need to be recognized again, but it may not be as urgent as other new faces or other faces with higher priorities.

A face having a state_pre of "new" in a previous frame can be transitioned to the pre-stranger state (pre_stranger) in the current frame when the confidence score (S) for the face in the current frame is less than (or equal to) the minimum confidence threshold $T_0$ (denoted as $S < T_0$). The pre-stranger state can be used when the confidence score (S) for the face has not been less than the minimum confidence threshold $T_0$ for enough frames. However, a face with state-pre of new that has had a confidence score less than the minimum confidence threshold $T_0$ for enough frames (e.g., based on the minimum counter threshold $C_0$) can be transitioned to the stranger state. For example, a face having a state_pre of "new" in a previous frame can be transitioned to the stranger state in the current frame when the confidence score (S) for the face in the current frame is less than (or equal to) the minimum confidence threshold $T_0$ (denoted as $S < T_0$) and when the history counter (C) for the face is greater than (or equal to) the minimum counter threshold $C_0$ (denoted as $C \geq C_0$).

A face that has a confirmed state as its previous state (state_pre) in a previous frame can be maintained in the confirmed state, or can be transitioned in the current frame to the non-confirmed state or the pre-stranger state. However, in some cases, the face having a confirmed state in a previous frame is not transitioned to the new state or the stranger state in the current frame. For instance, in such cases, if a "confirmed" face is identified as a different person in a current frame as compared to a person the face was identified as in a previous frame (Id!=Id_pre), this face will be transitioned to the non-confirmed state or the pre-stranger state in the current frame depending on whether the confirmed face is recognized with a very low confidence. For example, if a "confirmed" face is identified as a different person in a current frame and was recognized as the person (from the previous frame when recognition was performed) with a confidence above the minimum confidence threshold ($T_0$), the state of the face will be transitioned to the non-confirmed state. In another example, if a "confirmed" face is recognized as a different person in a current frame and was recognized as the person with a very low confidence, the state of the face will be transitioned to the pre-stranger state. Otherwise, it will be kept as confirmed and it will not be transitioned to the new or stranger states. In some cases, the face could be transitioned to the new state or the stranger state in the current frame.

For example, a face having a state_pre of "confirmed" in a previous frame can be maintained in the confirmed state when the Id of the face in the current frame matches the Id of the face in the previous frame (denoted as Id==Id_pre).

A face having a state_pre of "confirmed" in a previous frame can be transitioned to the non-confirmed state (not_confirmed) in the current frame when the Id of the face in the current frame does not match the Id of the face in the previous frame (denoted as Id!=Id_pre) and when the confidence score (S) for the face in the current frame is greater than (or equal to) the minimum confidence threshold $T_0$ (denoted as $S > T_0$). In a similar situation, but when the confidence score is less than the minimum confidence threshold $T_0$, the face can be transitioned from "confirmed" to the "pre-stranger" status. For example, a face having a state_pre of "confirmed" in a previous frame can be transitioned to the pre-stranger state (pre_stranger) in the current frame when the Id of the face in the current frame does not match the Id of the face in the previous frame (denoted as Id!=Id_pre) and when the confidence score (S) for the face in the current frame is less than (or equal to) the minimum confidence threshold $T_0$ (denoted as $S \leq T_0$).

A face that has a non-confirmed state as its previous state (state_pre) in a previous frame can be maintained in the non-confirmed state, or can be transitioned in the current frame to the new state, the confirmed state, or the pre-stranger state. However, in some cases, the face having a non-confirmed state in a previous frame is not transitioned to the stranger state in the current frame. For example, such cases are designed to ensure that the face will still have a chance to be recognized again in one or more subsequent frames, whereas, if the face were transitioned to the stranger state, the face would have the lowest base priority and would not be recognized for a period of time (e.g., in the next several seconds). In some cases, the face could be transitioned to the stranger state in the current frame.

For example, a face having a state_pre of "non-confirmed" (not_confirmed) in a previous frame can be transitioned to the new state when the Id of the face in the current frame matches the Id of the face in the previous frame (denoted as Id==Id_pre) and when the confidence score (S) for the face in the current frame is greater than (or equal to) the first confidence threshold $T_1$ but less than the second (or high) confidence threshold $T_2$ (denoted as $T_1 \leq S < T_2$). However, if the confidence score is very high, the state can be transitioned to the confirmed state. For example, a face having a state_pre of "non-confirmed" (not_confirmed) in a previous frame can be transitioned to the confirmed state when the confidence score (S) for the face in the current frame is greater than the high confidence threshold $T_2$ (denoted as $S>T_2$). In such an example, the Id and the Id_pre may not be compared since the confidence score (S) for the face is so high (higher than $T_2$). In some cases, the Id and Id_pre can be compared (Id==Id_pre) to determine if the Ids match, even when the confidence score (S) for the face is greater than $T_2$.

In another example, a face having a state_pre of "non-confirmed" (not_confirmed) in a previous frame can be maintained in the non-confirmed state in the current frame when the Id of the face in the current frame does not match the Id of the face in the previous frame (denoted as Id!=Id_pre). A face having the "non-confirmed" (not_confirmed) state_pre in a previous frame can be transitioned to the pre-stranger state when the confidence score (S) for the face in the current frame is less than the minimum confidence threshold $T_0$ (denoted as $S<T_0$).

A face that has a pre-stranger state as its previous state (state_pre) in a previous frame can be maintained in the pre-stranger state, or can be transitioned in the current frame to the new state, the non-confirmed state, or the stranger state. However, in some cases, the face having a pre-stranger state in a previous frame is not transitioned to the confirmed state in the current frame. For example, such cases are designed to have the system double check again if the face should be "confirmed" since it is doubtful when the face is a "pre-stranger." In some cases, the face could be transitioned to the confirmed state in the current frame.

For example, a face having a state_pre of "pre-stranger" (pre_stranger) in a previous frame can be transitioned to the new state when the Id of the face in the current frame matches the Id of the face in the previous frame (denoted as Id==Id_pre) and when the confidence score (S) for the face in the current frame is greater than (or equal to) the first confidence threshold $T_1$ but less than the second (or high) confidence threshold $T_2$ (denoted as $T_1 \le S<T_2$). A face having a state_pre of "pre-stranger" in a previous frame can be transitioned to the non-confirmed state when the Id of the face in the current frame matches the Id of the face in the previous frame (denoted as Id==Id_pre) and when the confidence score (S) for the face in the current frame is greater than (or equal to) the minimum confidence threshold $T_0$ but less than the first threshold $T_1$ (denoted as $T_0 \le S<T_1$).

If the confidence score of a face that had a "pre-stranger" state in a previous frame is less than the minimum confidence threshold $T_0$, the state of the face may either be maintained in the pre-stranger state or be transitioned to the stranger state depending on the number of frames that the confidence score of the face has been below the minimum confidence threshold $T_0$. As noted above, the pre-stranger state can be maintained when the confidence score (S) for the face has been less than the minimum confidence threshold $T_0$, but not for enough frames. For example, a face having a state_pre of "pre-stranger" (pre_stranger) in a previous frame can be maintained in the pre-stranger state in the current frame when the Id of the face in the current frame matches the Id of the face in the previous frame (denoted as Id==Id_pre), when the confidence score (S) for the face in the current frame is less than (or equal to) the minimum confidence threshold $T_0$ (denoted as $S<T_0$), and when the history counter (C) for the face is less than the minimum counter threshold $C_0$ (denoted as $C<C_0$). However, a face previously in the pre-stranger state that has had a confidence score less than the minimum confidence threshold $T_0$ for enough frames (e.g., based on the minimum counter threshold $C_0$) can be transitioned to the stranger state. For example, a face having a state_pre of "pre-stranger" (pre_stranger) in a previous frame is transitioned to the stranger state in the current frame when the Id of the face in the current frame matches the Id of the face in the previous frame (denoted as Id==Id_pre), when the confidence score (S) for the face in the current frame is less than (or equal to) the minimum confidence threshold $T_0$ (denoted as $S<T_0$), and when the history counter (C) for the face is greater than (or equal to) the minimum counter threshold $C_0$ (denoted as $C \ge C_0$).

A face that has a stranger state as its previous state (state_pre) in a previous frame can be maintained in the stranger state, or can be transitioned in the current frame to the new state or the pre-stranger state. However, in some cases, the face having a stranger state in a previous frame is not transitioned to the confirmed state or the non-confirmed state in the current frame. For example, such cases are designed to ensure the face is double checked before it is transitioned to the confirmed or non-confirmed states since the history of the face is suspicious. In some cases, the face could be transitioned to the confirmed state or the non-confirmed state in the current frame.

For example, a face having a state_pre of "stranger" in a previous frame can be transitioned to the new state when the Id of the face in the current frame matches the Id of the face in the previous frame (denoted as Id==Id_pre), when the confidence score (S) for the face in the current frame is greater than (or equal to) the first threshold $T_1$ but less than the second (or high) threshold $T_2$ (denoted as $T_1 \le S<T_2$), and when a history counter (C) for the face is greater than (or equal to) a first counter threshold (denoted as $C \ge C_1$).

If the confidence score of a face that had a "stranger" state in a previous frame is greater than (or equal to) the minimum confidence threshold $T_0$, but less than the first threshold $T_1$, the state of the face may be transitioned from the stranger state to the pre-stranger state. For example, a face having a state_pre of "stranger" in a previous frame can be transitioned to the pre-stranger state in the current frame when the Id of the face in the current frame matches the Id of the face in the previous frame (denoted as Id==Id_pre), and when the confidence score (S) for the face in the current frame is greater than (or equal to) the minimum confidence threshold $T_0$ but is less than the first confidence threshold $T_1$ (denoted as $T_0 \le S<T_1$). However, if the confidence score (S) of a face previously having the stranger state is still less than the minimum confidence threshold $T_0$ in the current frame, the state can be maintained as the stranger state in the current frame. For example, a face having a state_pre of "stranger" in a previous frame can be maintained in the stranger state in the current frame when the Id of the face in the current frame matches the Id of the face in the previous frame (denoted as Id==Id_pre) and when the confidence score (S) for the face in the current frame is less than the minimum confidence threshold $T_0$ (denoted as $S<T_0$). In some cases, a face having a state_pre of "stranger" in a previous frame can be maintained in the stranger state in the current frame when the history counter (C) for the face is less than (or equal to) the first counter threshold (denoted as $C<C_1$).

The examples shown in FIG. 6 and described above are for illustrative purposes. One of ordinary skill will appreciate that the state transitions can be based on other factors or can be based on variations of the factors shown in FIG. 6.

The states determined for faces in a frame or image can be used to determine recognition priorities for the faces. For example, when there are many faces detected in one frame, it can be difficult and sometimes impossible to recognize all the faces in the frame due to the limitation of CPU resources. In one example, the CPU resources of an embedded camera system (e.g., in an IP camera or other suitable camera with an embedded video analytics system) can be limited. The priorities determined for each tracked face can be used to prioritize the order of the faces for which face recognition will be applied. For example, a face with higher priority will be recognized earlier in the recognition system than faces having lower priorities. By prioritizing the faces for face recognition, the CPU resources are efficiently used and face recognition can be performed in real-time.

The initial priority assigned to a tracked face can be defined based on the state of the tracked face. For example, a base priority can be defined for each state. The base priority can be initially assigned to a tracked face when the face is assigned a given state (e.g., when the face is first given a state, when the face is transitioned from one state to another state, or the like). In some cases, the new state can have a highest base priority, as compared to the base priorities of the other states. A next highest base priority is defined for a non-confirmed state, followed by the pre-stranger state, the confirmed state, and the stranger state, in descending order.

When a face is determined to have a certain state in a current frame, the base priority defined for that state is assigned to the object in the current frame. For instance, if a face is recognized in a current frame and its state is changed to a different state at the current frame, the priority for the face will be updated for the current frame to the base priority defined for the newly assigned state. In one illustrative example, a face that is determined to have the new state in a current frame can be assigned with the base priority that is defined for the new state. In some cases, if the state of an object is maintained in its current state in a current frame (in which case the state from a previous frame is not updated to a different state in the current frame), the priority for the object will be increased by a pre-defined amount. In some cases, if an object is detected and tracked in a current frame, but is not recognized in the current frame, the priority of the object will be increased by the pre-defined amount.

FIG. 7 is a diagram illustrating examples of base priorities for the different states. As shown, the stranger state is associated with the lowest base priority $P_1$. The base priority $P_1$ can be set to any suitable value, such as a value of 1, 10, 100, or any other configurable value that can be programmed into the face recognition system 200. The confirmed state is given the next highest base priority $P_2$. The base priority $P_2$ is equal to the value of the base priority $P_1$ plus an additional value $N_1$. The value $N_1$ can include any integer value greater than 0, and can be configurable or changed at the system level. In one illustrative example, if the base priority $P_1$ is equal to 1, the value of $N_1$ can be set to a value of 1, making the value of the base priority $P_2$ equal to a value of 2. Any other suitable values for $P_1$ and $N_1$ could be used.

The next highest base priority $P_3$ is defined for the pre-stranger state (pre_stranger). The base priority $P_3$ is equal to the value of the base priority $P_2$ plus an additional value $N_2$. The value $N_2$ can include any integer value greater than 0, and can be configurable or changed at the system level. In some cases, the value of $N_2$ can be the same as the value of $N_1$. For example, if the base priority $P_2$ is equal to 2 (based on the example above of $P_1=1$ and $N_1=1$), the value of $N_2$ can be set to a value of 1, making the value of the base priority $P_3$ equal to a value of 3. In some cases, the value of $N_2$ can be set to be a different value than the value of $N_1$. For example, if the base priority $P_2$ is equal to 2, the value of $N_2$ can be set to a value of 2, making the value of the base priority $P_3$ equal to a value of 4. Any other suitable values for $P_1$, $N_1$, and $N_2$ could be used.

The non-confirmed state (not_confirmed) is given the next highest base priority $P_4$. The base priority $P_4$ is equal to the value of the base priority $P_3$ plus an additional value $N_3$. The value $N_3$ can include any integer value greater than 0, and can be configurable or changed at the system level. In some cases, the value of $N_3$ can be the same as the value of $N_1$ and/or $N_2$. For example, if the base priority $P_3$ is equal to 3 (based on the example above of $P_1=1$, $N_1=1$, and $N_2=1$), the value of $N_3$ can be set to a value of 1, making the value of the base priority $P_4$ equal to a value of 4. In some cases, the value of $N_3$ can be set to be a different value than the value of $N_1$ and/or $N_2$. For example, $P_1$ can be set to a value of 1, $N_1$ can be set to a value of 1, $N_2$ can be set to a value of 2, and $N_3$ can be set to a value of 3. In such an example, the base priority $P_3$ is equal to 4, making the value of the base priority $P_4$ equal to a value of 7 ($P_4=4+3$). Any other suitable values for $P_1$, $N_1$, $N_2$, and $N_3$ could be used.

The highest base priority $P_5$ is assigned to the new state. The base priority $P_5$ is equal to the value of the base priority $P_4$ plus an additional value $N_4$. The value $N_4$ can include any integer value greater than 0, and can be configurable or changed at the system level. In some cases, the value of $N_4$ can be the same as the value of $N_1$, $N_2$, and/or $N_3$. For example, if the base priority $P_4$ is equal to 4 (based on the example above of $P_1=1$, $N_1=1$, $N_2=1$, and $N_3=1$), the value of $N_4$ can be set to a value of 1, making the value of the base priority $P_5$ equal to a value of 5. In some cases, the value of $N_4$ can be set to be a different value than the value of $N_1$, $N_2$, and/or $N_3$. For example, $P_1$ can be set to a value of 1, $N_1$ can be set to a value of 1, $N_2$ can be set to a value of 2, $N_3$ can be set to a value of 3, and $N_4$ can be set to a value of 3. In such an example, the base priority $P_4$ is equal to 7, making the value of the base priority $P_5$ equal to a value of 10 ($P_4=7+3$). Any other suitable values for $P_1$, $N_1$, $N_2$, $N_3$, and $N_4$ could be used.

One reason a new face can be assigned the highest base priority ($P_5$) is because new faces should be recognized as soon as possible. For example, a new face is a face that cannot be matched to any existing tracked faces, and thus can be prioritized to be recognized before other faces that can be matched to previously existing faces. The non-confirmed faces can be prioritized at a next highest base priority ($P_4$) because these faces should be recognized as soon as possible if no new faces (or other faces having a high priority) are detected in the current frame or if all such faces in the current frame have already been recognized and there is time and resources to recognize the non-confirmed faces. The pre_stranger faces can be given the next highest base priority ($P_3$) because, in some cases, such faces may not be urgent for object recognition due to these faces historically having lower confidence scores, meaning that the system may not have a high success rate in recognizing the pre-stranger faces. A confirmed face has a lower priority ($P_2$) than the pre-stranger faces for recognition because there is a high confidence that the person has already been recognized (due to a very high confidence score, such as greater than the confidence threshold $T_2$). For instance, in some cases, faces having the confirmed state can be skipped over for face recognition for a period as long as such faces can be tracked. Faces having the stranger state can be assigned the lowest base priority ($P_1$) since the system has identified such faces as not being registered in the enrolled database of enrolled, known faces (or other objects), and forcibly recognizing a face not in the database can be a waste of CPU resources. In some cases, it is possible that a face is not recognized as an enrolled face since it is too blurry or too small with low image quality, and thus can be given the stranger state. In some implementations, in order to deal with such situations, a face having the stranger state can have its priority updated (e.g., can be increased by a pre-defined amount, as described below) and then can be recognized after a certain amount of time or a certain number of frames. Such implementations provide the ability for faces in the stranger state to have a chance to be recognized due to previous low quality faces.

In some cases, the priority assigned to a face can also be increased when certain conditions occur. For instance, the priority of a face by default will be incremental across frames if the face is not changed to another state in the frames. In one illustrative example, a face having a stranger state that is assigned the lowest base priority ($P_1$) in a previous frame can have its priority increased by a pre-defined amount in later frames in certain cases. For example, in some cases, as described above, if a face is recognized in a current frame and its state is changed to a different state, the priority of the face will be updated to the base priority of the new state. In such cases, a state change may only occur for a face in a current frame when the face is recognized in the current frame. However, the priority is incremental for all the faces, regardless of whether face recognition applies. For example, if the state of the face is not changed in the current frame, the priority of the face for the current frame will be increased by the pre-defined amount (e.g., by a value of 1 or other suitable and configurable value). In addition, in some cases, if a face is not recognized in the current frame, the priority of the face will also be increased by the pre-defined amount for the current frame (e.g., by 1 or other suitable and configurable value).

In one illustrative example, the base priorities can be set to the following values: $P_1=0$; $P_2=50$; $P_3=70$; $P_4=95$; and $P_5=100$. Such values indicate how long to wait before applying full face recognition to a given face. The priority can be incremented by a value of 1 for each frame (e.g., if the face is not recognized in a current frame and/or if a state of the face is not changed in the current frame). In such an example, a face can be recognized (or considered for recognition) if its priority value is greater than a threshold priority. The threshold priority can be equal to one of the base priorities (e.g., $P_4$, $P_5$, or other base priority) or can be equal to a pre-defined value other than a base priority (e.g., 85, 90, 98, or other suitable value).

After face detection and tracker update, the priorities and states of the tracked faces are updated based on the tracking result. In some cases, the priorities of the tracked faces are sorted and the faces with the highest priorities that are greater than a threshold priority will be recognized. In one illustrative example, the threshold priority can be set to $P_4$ or other suitable and configurable priority value. In such cases, only faces with priorities above the threshold priority are considered for face recognition. Face recognition can then be performed for one or more of the faces having priorities above the threshold priority based on the priorities of the faces. For example, if two faces in a current frame have priority values above the threshold priority, the full face recognition process is performed on the face with the highest priority first, followed by the other face if time and CPU resources permit. In some cases, if the priorities of the tracked faces are all less than the threshold priority (e.g., $P_4$ or other suitable priority threshold), then all the faces can be skipped for face recognition in the current frame to save CPU resources.

In some cases, one or more factors can be used to further prioritize faces that have a same priority value. In one illustrative example, if multiple faces have the same highest priority value, then the largest face can be recognized first. For instance, the sizes of the faces having the same priority value can be determined, and the face that is determined to be the largest can be recognized before the smaller face or faces having the same priority value. In some cases, sizes are only determined for faces that have the highest priorities and that are considered for face recognition. For instance, sizes may not be determined for faces that have priorities below the threshold priority, and/or faces that are above the threshold priority but that will not be processed by the full face recognition process due to lack of time and/or CPU resources. The sizes of the faces can be used as a factor for prioritizing the faces for face recognition due to the larger faces being more likely to be recognized with a higher confidence value than smaller faces. For example, face recognition performs better for larger faces because more detail is present for recognizing the larger faces. The faces can differ in size based on a size of the person, based on a distance of the person from the camera, based on an amount of occlusion of the faces, among other factors. Any other suitable factors can also be used to further prioritize faces that have a same priority value.

After face recognition is performed for the one or more faces, the state of the faces will be updated according to the recognition results. For example, for a given face, the confidence score, the person ID, and/or the history counter can be updated after face recognition is performed for the face. The state of the face can then be updated based on the updated parameters.

Figure 8:
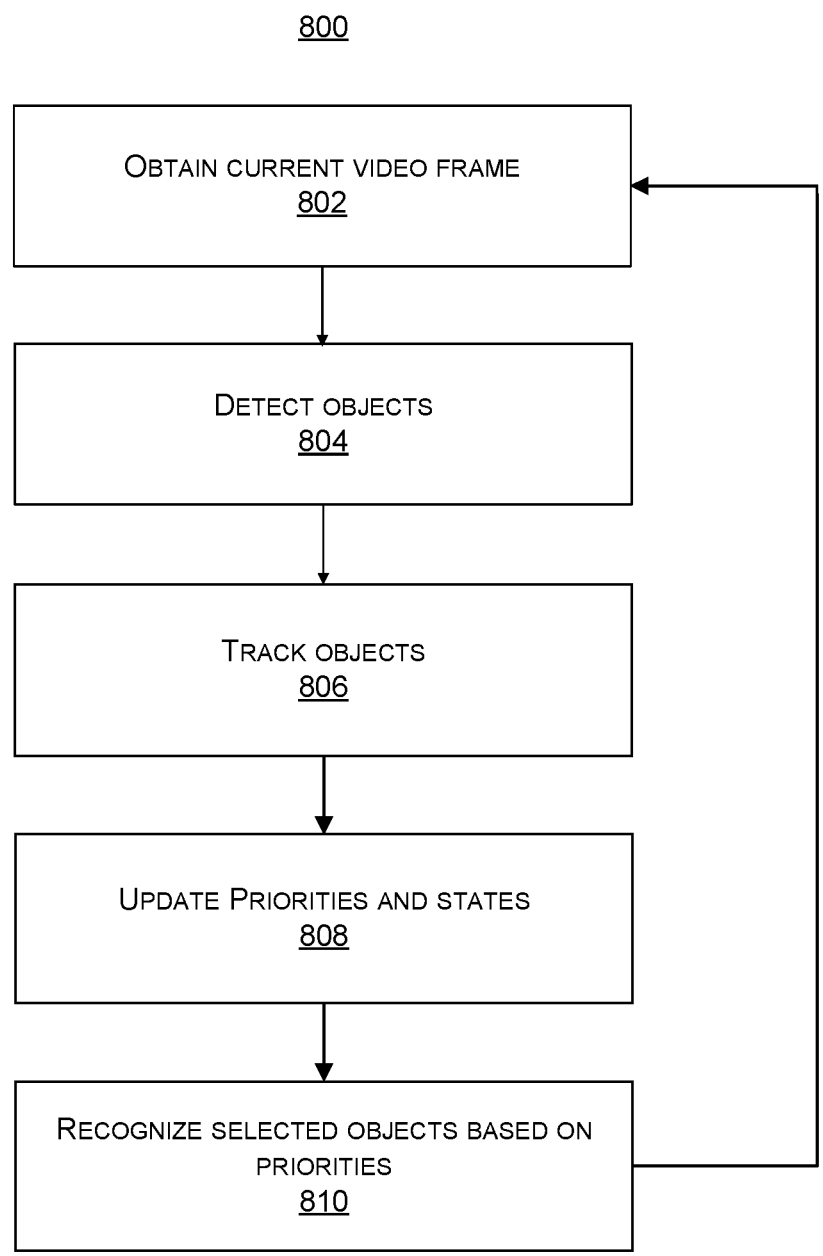
FIG. 8 is a flowchart illustrating an example of an object recognition process that utilizes object prioritization, in accordance with some embodiments.

FIG. 8 is a flowchart illustrating an example of an object recognition process 800 that utilizes object prioritization. At block 802, the process 800 includes obtaining a current video frame or image. The current video frame can include a video frame of a video sequence capturing images of a scene, as described above. The current frame can include multiple objects that are located in the scene. The objects can include any suitable objects, such as people, cars, animals, among others.

At block 804, the process 800 includes detecting objects in the current frame. For example, the object recognition system 200 can be configured or programmed to detect certain objects, such as faces of people, cars, animals, or other objects or items in the scene. Faces will be used as an example of the objects that are detected and tracked in the current video frame. However, one of ordinary skill will appreciate that the object recognition system 200 can be configured to detect and track any other suitable objects. The object recognition system 200 can detect faces in the current video frame using the techniques described above with respect to FIG. 1 and FIG. 2.

At block 806, the process 800 includes tracking the detected objects in the current frame. For example, the object recognition system 200 can track the detected faces in the current video frame using the techniques described above with respect to FIG. 1 and FIG. 2. The tracked faces can be associated with bounding boxes, as previously described.

At block 808, the process 800 updates priorities and states of the tracked objects. For example, as described above, given a state_pre, a unique person identifier, a confidence score, and/or a history counter in the current state for a given face in the current frame, the state of the face can be updated. The priority of the face can be updated to a base priority of a given state when the state of the face is changed to the given state. The base priorities are shown in FIG. 7. In some cases, if the state is not changed, the priority of a tracked face can be incremented by the pre-defined amount described above (e.g., by a value of 1, or other suitable amount). In such cases, it is possible that a face with a state having a low base priority (e.g., a stranger face) can have a higher priority to be recognized in the current frame before other faces with states having higher base priorities, since the face stays in its current state for enough frames.

The priority-based object recognition techniques described herein solve the problem of when there are many faces detected in one frame, which makes it difficult and sometimes impossible to recognize all the faces in the frame due to the limitation of CPU resources of devices. For example, some faces cannot be recognized in a current frame due to other faces being recognized before those faces in each frame. By prioritizing the faces for face recognition, CPU resources of devices are efficiently used and face recognition can be performed in real-time. For instance, such techniques can help to efficiently utilize the limited CPU resources of computing devices, such as an embedded camera system (e.g., in an IP camera or other suitable camera with an embedded video analytics system). Further, using the dynamic priority-based object recognition techniques described herein, it is possible that a face with lower base priority that stays in a certain state for an amount of time (or number frames) has a higher priority than a face newly updated with a higher base priority. Such techniques provide the ability for a face with a lower original (or base) priority to be recognized in busy scenes when multiple faces appear in the scenes consistently.

Figure 9:
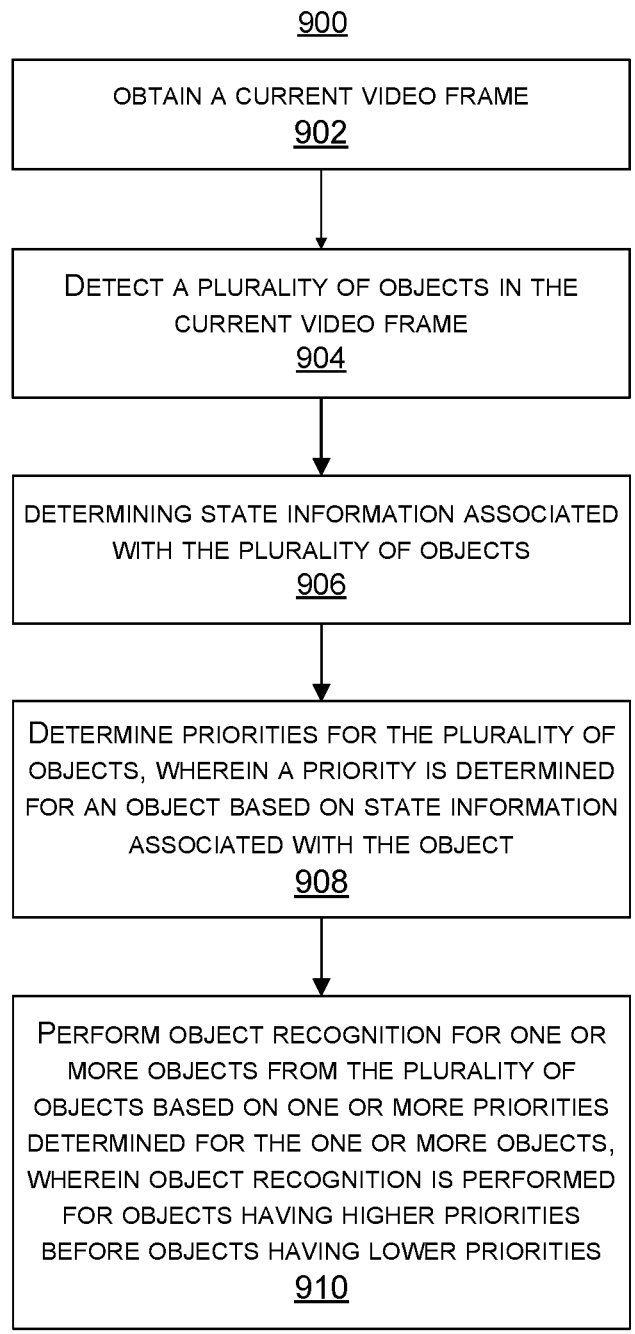
FIG. 9 is a flowchart illustrating an example of a process of prioritizing objects for object recognition in one or more video frames, in accordance with some embodiments.

FIG. 9 is a flowchart illustrating an example of a process 900 of prioritizing objects for object recognition in one or more video frames using the techniques described herein. At block 902, the process 900 includes obtaining a current video frame. The current video frame includes the frame (e.g., a frame of a video sequence or an image) currently being processed by a face recognition system or other suitable system or device. At block 904, the process 900 includes detecting a plurality of objects in the current video frame. In some aspects, the plurality of objects include a plurality of faces. In one illustrative example, the object detection engine 210 can perform face detection to detect one or more faces in the current video frame using the techniques previously described. Other forms of object detection can also be used.

At block 906, the process 900 includes determining state information associated with the plurality of objects. At block 908, the process 900 includes determining priorities for the plurality of objects. For example, a priority is determined for an object based on state information associated with the object. Illustrative examples of determining state information and priorities are provided below and are discussed herein. At block 910, the process 900 includes performing object recognition for one or more objects from the plurality of objects based on one or more priorities determined for the one or more objects. For example, object recognition is performed for objects having higher priorities before objects having lower priorities. In some examples, the object recognition includes face recognition, such as using the techniques described above with respect to FIG. 2.

In some examples, the process 900 includes obtaining object identifiers, confidence scores, and history counter information for the plurality of objects. History counter information for an object indicates at least a number of frames the object has had a current state. In such examples, the process 900 further includes determining the state information for the plurality of objects based on the object identifiers, the confidence scores, and the history counter information for the plurality of objects.

In some examples, the process 900 includes increasing a priority for an object for the current video frame by a pre-defined amount in response to a state of the object being maintained in a current state for the current frame.

In some examples, the process 900 includes tracking the plurality of objects in the current video frame. Tracking can include matching an object in the current video frame with a previously detected object. In such examples, the process 900 further includes updating the state information associated with the plurality of objects based on results of the tracking. In some aspects, tracking includes matching bounding boxes of the plurality of objects in the current video frame with bounding boxes of a plurality of objects detected in a previous video frame. In some cases, tracking an object includes determining one or more key points from an object detected in a previous video frame, and matching the one or more key points from the object detected in the previous frame with one or more key points from the object detected in the current video frame. In some cases, an object detected in the current video frame that is not matched with any object detected in a previous video frame is assigned a new state. In some instances, objects assigned a new state are given a higher base priority than objects assigned to other states.

In some examples, the process 900 includes determining an object detected in the current video frame has a new state, determining an object identifier for the object matches an object identifier of a previously detected object that matches the object in the current video frame, and determining a confidence score for the object is greater than a first confidence threshold and is less than a second confidence threshold. The first confidence threshold is less than the second confidence threshold. For example, the first confidence threshold can include the threshold $T_1$ and the second confidence threshold can include the threshold $T_2$ discussed above with respect to FIG. 6. In such examples, the process 900 further includes determining a history counter for the object is less than a first counter threshold, the first counter threshold including a count of a number of video frames the confidence score for the object is greater than the first confidence threshold. For example, the first counter threshold can include the threshold $C_1$ discussed above with respect to FIG. 6. In such examples, the process 900 further includes maintaining a state of the object in the new state based on the confidence score for the object being greater than the first confidence threshold and less than the second confidence threshold and based on the history counter for the object being less than the first counter threshold. In some examples, the process 900 includes increasing a priority for the object by a pre-defined amount in response to the state of the object being maintained in the new state.

In some examples, the process 900 includes determining an object detected in the current video frame has a new state, determining a confidence score for the object is greater than a second confidence threshold, and changing a state of the object from the new state to a confirmed state based on the confidence score for the object being greater than the second confidence threshold. The confirmed state indicates a confirmation that object recognition previously performed on the object was successful. In some examples, the process 900 includes changing a priority for the object to a base priority associated with the confirmed state in response to changing the state of the object from the new state to the confirmed state. In some cases, the base priority associated with the confirmed state is less than a base priority associated with the new state.

In some examples, the process 900 includes determining an object detected in the current video frame has a new state, determining an object identifier for the object matches an object identifier of a previously detected object that matches the object in the current video frame, and determining a confidence score for the object is greater than a first confidence threshold and is less than a second confidence threshold. The first confidence threshold is less than the second confidence threshold. In such examples, the process 900 further includes determining a history counter for the object is greater than a first counter threshold, the first counter threshold including a count of a number of video frames the confidence score for the object is greater than the first confidence threshold, and changing a state of the object from the new state to a confirmed state based on the confidence score for the object being greater than the first confidence threshold and less than the second confidence threshold and based on the history counter for the object being greater than the first counter threshold. In some examples, the process 900 includes increasing a priority for the object by a pre-defined amount in response to the state of the object being maintained in the new state.

In some examples, the process 900 includes determining an object detected in the current video frame has a new state, determining an object identifier for the object does not match an object identifier of a previously detected object that matches the object in the current video frame, and changing a state of the object from the new state to a non-confirmed state based on the object identifier for the object not matching the object identifier of the previously detected object. In some examples, the process 900 includes changing a priority for the object to a base priority associated with the non-confirmed state in response to changing the state of the object from the new state to the non-confirmed state. In some cases, the base priority associated with the non-confirmed state is less than a base priority associated with the new state.

In some examples, the process 900 includes determining an object detected in the current video frame has a new state, and determining a confidence score for the object is less than a minimum confidence threshold. The minimum confidence threshold is used to identify a stranger. For example, the minimum confidence threshold can include the threshold $T_0$ discussed above with respect to FIG. 6. As previously described herein, a stranger is an object not registered in a database of known objects (which can be referred to as an enrolled database). In such examples, the process 900 further includes changing a state of the object from the new state to a pre-stranger state based on the confidence score for the object being less than the minimum confidence threshold. In some examples, the process 900 includes changing a priority for the object to a base priority associated with the pre-stranger state in response to changing the state of the object from the new state to the pre-stranger state. In some cases, the base priority associated with the pre-stranger state is less than a base priority associated with the new state.

In some examples, the process 900 includes determining an object detected in the current video frame has a new state, and determining a confidence score for the object is less than a minimum confidence threshold. The minimum confidence threshold is used to identify a stranger, and, as noted above, a stranger is an object not registered in a database of known objects. In such examples, the process 900 further includes determining a history counter for the object is greater than a minimum counter threshold, the minimum counter threshold including a count of a number of video frames the confidence score for the object is less than the minimum confidence threshold. For example, the minimum counter threshold can include the threshold $C_0$ discussed above with respect to FIG. 6. In such examples, the process 900 further includes changing a state of the object from the new state to a stranger state based on the confidence score for the object being less than the minimum confidence threshold and based on the history counter for the object being greater than the minimum counter threshold. In some examples, the process 900 includes changing a priority for the object to a base priority associated with the stranger state in response to changing the state of the object from the new state to the stranger state. In some cases, the base priority associated with the stranger state is less than a base priority associated with the new state.

In some examples, the process 900 includes determining an object detected in the current video frame has a confirmed state, the confirmed state indicating a confirmation that object recognition previously performed on the object was successful. In such examples, the process 900 further includes determining an object identifier for the object matches an object identifier of a previously detected object that matches the object in the current video frame, and maintaining a state of the object in the confirmed state based on the object identifier for the object matching the object identifier of the previously detected object. In some examples, the process 900 includes increasing a priority for the object by a pre-defined amount in response to the state of the object being maintained in the confirmed state.

In some examples, the process 900 includes determining an object detected in the current video frame has a confirmed state, the confirmed state indicating a confirmation that object recognition previously performed on the object was successful. In such examples, the process 900 further includes determining an object identifier for the object does not match an object identifier of a previously detected object that matches the object in the current video frame, and determining a confidence score for the object is greater than a minimum confidence threshold. The minimum confidence threshold is used to identify a stranger. In such examples, the process 900 further includes changing a state of the object from the confirmed state to a non-confirmed state based on the object identifier for the object not matching the object identifier of the previously detected object and based on the confidence score for the object being greater than the minimum confidence threshold. In some examples, the process 900 includes changing a priority for the object to a base priority associated with the non-confirmed state in response to changing the state of the object from the confirmed state to the non-confirmed state. In some cases, the base priority associated with the non-confirmed state is higher than a base priority associated with the confirmed state.

In some examples, the process 900 includes determining an object detected in the current video frame has a confirmed state, the confirmed state indicating a confirmation that object recognition previously performed on the object was successful. In such examples, the process 900 further includes determining an object identifier for the object does not match an object identifier of a previously detected object that matches the object in the current video frame, and determining a confidence score for the object is less than a minimum confidence threshold. The minimum confidence threshold is used to identify a stranger. In such examples, the process 900 further includes changing a state of the object from the confirmed state to a pre-stranger state based on the object identifier for the object not matching the object identifier of the previously detected object and based on the confidence score for the object being less than the minimum confidence threshold. In some examples, the process 900 includes changing a priority for the object to a base priority associated with the pre-stranger state in response to changing the state of the object from the confirmed state to the pre-stranger state. In some cases, the base priority associated with the pre-stranger state is greater than a base priority associated with the confirmed state.

In some examples, the process 900 includes determining an object detected in the current video frame has a non-confirmed state, determining an object identifier for the object matches an object identifier of a previously detected object that matches the object in the current video frame, and determining a confidence score for the object is greater than a first confidence threshold and is less than a second confidence threshold. The first confidence threshold is less than the second confidence threshold. In such examples, the process 900 further includes changing a state of the object from the non-confirmed state to a new state based on the object identifier for the object matching the object identifier of the previously detected object and based on the confidence score for the object being greater than the first confidence threshold and less than the second confidence threshold. In some examples, the process 900 includes changing a priority for the object to a base priority associated with the new state in response to changing the state of the object from the non-confirmed state to the new state. In some cases, the base priority associated with the new state is greater than a base priority associated with the non-confirmed state.

In some examples, the process 900 includes determining an object detected in the current video frame has a non-confirmed state, and determining a confidence score for the object is greater than a second confidence threshold. The second confidence threshold is used to confirm that object recognition previously performed on the object was successful. In such examples, the process 900 further includes changing a state of the object from the non-confirmed state to a confirmed state based on the confidence score for the object being greater than the second confidence threshold. In some examples, the process 900 includes changing a priority for the object to a base priority associated with the confirmed state in response to changing the state of the object from the non-confirmed state to the confirmed state. In some cases, the base priority associated with the confirmed state is less than a base priority associated with the non-confirmed state.

In some examples, the process 900 includes determining an object detected in the current video frame has a non-confirmed state, determining an object identifier for the object does not match an object identifier of a previously detected object that matches the object in the current video frame, and maintaining a state of the object in the non-confirmed state based on the object identifier for the object not matching the object identifier of the previously detected object. In some examples, the process 900 includes increasing a priority for the object by a pre-defined amount in response to the state of the object being maintained in the non-confirmed state.

In some examples, the process 900 includes determining an object detected in the current video frame has a non-confirmed state, and determining a confidence score for the object is less than a minimum confidence threshold. The minimum confidence threshold is used to identify a stranger.

In such examples, the process 900 further includes changing a state of the object from the non-confirmed state to a pre-stranger state based on the confidence score for the object being less than the minimum confidence threshold. In some examples, the process 900 includes changing a priority for the object to a base priority associated with the pre-stranger state in response to changing the state of the object from the non-confirmed state to the pre-stranger state. In some cases, the base priority associated with the pre-stranger state is less than a base priority associated with the non-confirmed state.

In some examples, the process 900 includes determining an object detected in the current video frame has a pre-stranger state. As noted previously, a stranger is an object not registered in a database of known objects. In such examples, the process 900 further includes determining an object identifier for the object matches an object identifier of a previously detected object that matches the object in the current video frame, and determining a confidence score for the object is greater than a first confidence threshold and is less than a second confidence threshold. The first confidence threshold is less than the second confidence threshold. In such examples, the process 900 further includes changing a state of the object from the pre-stranger state to a new state based on the object identifier for the object matching the object identifier of the previously detected object and based on the confidence score for the object being greater than the first confidence threshold and less than the second confidence threshold. In some examples, the process 900 includes changing a priority for the object to a base priority associated with the new state in response to changing the state of the object from the pre-stranger state to the new state. In some cases, the base priority associated with the new state is greater than a base priority associated with the pre-stranger state.

In some examples, the process 900 includes determining an object detected in the current video frame has a pre-stranger state, determining an object identifier for the object matches an object identifier of a previously detected object that matches the object in the current video frame, and determining a confidence score for the object is greater than a minimum confidence threshold and is less than a first confidence threshold. The minimum confidence threshold is less than the first confidence threshold. In such examples, the process 900 further includes changing a state of the object from the pre-stranger state to a non-confirmed state based on the object identifier for the object matching the object identifier of the previously detected object and based on the confidence score for the object being greater than the minimum confidence threshold and less than the first confidence threshold. In some examples, the process 900 includes changing a priority for the object to a base priority associated with the non-confirmed state in response to changing the state of the object from the pre-stranger state to the non-confirmed state. In some cases, the base priority associated with the non-confirmed state is greater than a base priority associated with the pre-stranger state.

In some examples, the process 900 includes determining an object detected in the current video frame has a pre-stranger state, determining an object identifier for the object matches an object identifier of a previously detected object that matches the object in the current video frame, and determining a confidence score for the object is less than a minimum confidence threshold. The minimum confidence threshold is used to identify a stranger. In such examples, the process 900 further includes determining a history counter for the object is less than a minimum counter threshold. The minimum counter threshold includes a count of a number of video frames the confidence score for the object is less than the minimum confidence threshold. In such examples, the process 900 further includes maintaining a state of the object in the pre-stranger state based on the object identifier for the object matching the object identifier of the previously detected object, based on the confidence score for the object being less than the minimum confidence threshold, and based on the history counter for the object being less than the minimum counter threshold. In some examples, the process 900 includes increasing a priority for the object by a pre-defined amount in response to the state of the object being maintained in the pre-stranger state.

In some examples, the process 900 includes determining an object detected in the current video frame has a pre-stranger state, determining an object identifier for the object matches an object identifier of a previously detected object that matches the object in the current video frame, and determining a confidence score for the object is less than a minimum confidence threshold. The minimum confidence threshold is used to identify a stranger, as noted above. In such examples, the process 900 further includes determining a history counter for the object is greater than a minimum counter threshold, the minimum counter threshold including a count of a number of video frames the confidence score for the object is less than the minimum confidence threshold. In such examples, the process 900 further includes changing a state of the object from the pre-stranger state to a stranger state based on the object identifier for the object matching the object identifier of the previously detected object, based on the confidence score for the object being less than the minimum confidence threshold, and based on the history counter for the object being greater than the minimum counter threshold. In some examples, the process 900 includes changing a priority for the object to a base priority associated with the stranger state in response to changing the state of the object from the pre-stranger state to the stranger state. In some cases, the base priority associated with the stranger state is less than a base priority associated with the pre-stranger state.

In some examples, the process 900 includes determining an object detected in the current video frame has a stranger state. As noted previously, a stranger is an object not registered in a database of known objects. In such examples, the process 900 further includes determining an object identifier for the object matches an object identifier of a previously detected object that matches the object in the current video frame, and determining a confidence score for the object is greater than a first confidence threshold and is less than a second confidence threshold. The first confidence threshold is less than the second confidence threshold. In such examples, the process 900 further includes determining a history counter for the object is greater than a first counter threshold, the first counter threshold including a count of a number of video frames the confidence score for the object is greater than the first confidence threshold. In such examples, the process 900 further includes changing a state of the object from the stranger state to a new state based on the object identifier for the object matching the object identifier of the previously detected object, based on the confidence score for the object being greater than the first confidence threshold and less than the second confidence threshold, and based on the history counter for the object being greater than the first counter threshold. In some examples, the process 900 includes changing a priority for the object to a base priority associated with the new state in response to changing the state of the object from the stranger state to the new state. In some cases, the base priority associated with the new state is greater than a base priority associated with the stranger state.

In some examples, the process 900 includes determining an object detected in the current video frame has a stranger state, determining an object identifier for the object matches an object identifier of a previously detected object that matches the object in the current video frame, and determining a confidence score for the object is greater than a minimum confidence threshold and is less than a first confidence threshold. The minimum confidence threshold is less than the first confidence threshold. In such examples, the process 900 further includes changing a state of the object from the stranger state to a pre-stranger state based on the object identifier for the object matching the object identifier of the previously detected object and based on the confidence score for the object being greater than the minimum confidence threshold and less than the first confidence threshold. In some examples, the process 900 includes changing a priority for the object to a base priority associated with the pre-stranger state in response to changing the state of the object from the stranger state to the pre-stranger state. In some cases, the base priority associated with the pre-stranger state is greater than a base priority associated with the stranger state.

In some examples, the process 900 includes determining an object detected in the current video frame has a stranger state, determining an object identifier for the object matches an object identifier of a previously detected object that matches the object in the current video frame, and determining a confidence score for the object is less than a minimum confidence threshold. The minimum confidence threshold is used to identify a stranger. In such examples, the process 900 further includes maintaining a state of the object in the stranger state based on the object identifier for the object matching the object identifier of the previously detected object and based on the confidence score for the object being less than the minimum confidence threshold. In some examples, the process 900 includes increasing a priority for the object by a pre-defined amount in response to the state of the object being maintained in the stranger state.

In some examples, the process 900 may be performed by a computing device or an apparatus. In one illustrative example, the process 900 can be performed by the object recognition system 200 shown in FIG. 2. In some cases, the computing device or apparatus may include a processor, microprocessor, microcomputer, or other component of a device that is configured to carry out the steps of process 900. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 900 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The object recognition techniques discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

As noted above, one of ordinary skill will appreciate that the less than ("<") and greater than (">") symbols or terminology used herein can be replaced with less than or equal to ("≤") and greater than or equal to ("≥") symbols, respectively, without departing from the scope of this description.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. An apparatus for prioritizing objects for object recognition in one or more video frames, comprising:
   a memory configured to store video data associated with the one or more video frames; and
   a processor configured to:
   obtain a current video frame;
   detect a plurality of objects in the current video frame;
   determine state information associated with the plurality of objects, wherein state information associated with an object is determined based at least in part on a confidence score of whether the object is registered in a database of known objects;

determine priorities for the plurality of objects, wherein a priority is determined for an object based on state information associated with the object, and wherein priorities for objects with confidence scores below a first confidence threshold and priorities for objects with confidence scores above a second confidence threshold that is greater than the first confidence threshold are lower than priorities for objects with confidence scores between the first confidence threshold and the second confidence threshold; and perform object recognition for one or more objects from the plurality of objects based on one or more priorities determined for the one or more objects, wherein object recognition is performed for objects having higher priorities before objects having lower priorities.

2. The apparatus of claim 1, wherein the processor is configured to:

obtain object identifiers, confidence scores, and history counter information for the plurality of objects, wherein history counter information for an object indicates at least a number of frames the object has had a current state; and determine the state information for the plurality of objects based on the object identifiers, the confidence scores, and the history counter information for the plurality of objects.

3. The apparatus of claim 1, wherein the processor is configured to increase a priority for an object for the current video frame by a pre-defined amount in response to a state of the object being maintained in a current state for the current video frame.

4. The apparatus of claim 1, wherein the processor is configured to:

track the plurality of objects in the current video frame, wherein tracking includes matching an object in the current video frame with a previously detected object; and update the state information associated with the plurality of objects based on results of the tracking.

5. The apparatus of claim 4, wherein an object detected in the current video frame that is not matched with any object detected in a previous video frame is assigned a new state, wherein objects assigned a new state are given a higher base priority than objects assigned to other states.

6. The apparatus of claim 1, wherein the processor is configured to:

determine an object detected in the current video frame has a new state;

determine an object identifier for the object matches an object identifier of a previously detected object that matches the object in the current video frame;

determine the confidence score for the object is greater than the first confidence threshold and is less than the second confidence threshold;

determine a history counter for the object is less than a first counter threshold, the first counter threshold including a count of a number of video frames the confidence score for the object is greater than the first confidence threshold;

maintain a state of the object in the new state based on the confidence score for the object being greater than the first confidence threshold and less than the second confidence threshold and based on the history counter for the object being less than the first counter threshold; and increase a priority for the object by a pre-defined amount in response to the state of the object being maintained in the new state.

7. The apparatus of claim 1, wherein the processor is configured to:

determine an object detected in the current video frame has a new state;

determine the confidence score for the object is greater than the second confidence threshold;

change a state of the object from the new state to a confirmed state based on the confidence score for the object being greater than the second confidence threshold, the confirmed state indicating a confirmation that object recognition previously performed on the object was successful; and change a priority for the object to a base priority associated with the confirmed state in response to changing the state of the object from the new state to the confirmed state, wherein the base priority associated with the confirmed state is less than a base priority associated with the new state.

8. The apparatus of claim 1, wherein the processor is configured to:

determine an object detected in the current video frame has a new state;

determine an object identifier for the object matches an object identifier of a previously detected object that matches the object in the current video frame;

determine the confidence score for the object is greater than the first confidence threshold and is less than the second confidence threshold;

determine a history counter for the object is greater than a first counter threshold, the first counter threshold including a count of a number of video frames the confidence score for the object is greater than the first confidence threshold;

change a state of the object from the new state to a confirmed state based on the confidence score for the object being greater than the first confidence threshold and less than the second confidence threshold and based on the history counter for the object being greater than the first counter threshold; and change a priority for the object to a base priority associated with the confirmed state in response to changing the state of the object from the new state to the confirmed state, wherein the base priority associated with the confirmed state is less than a base priority associated with the new state.

9. The apparatus of claim 1, wherein the processor is configured to:

determine an object detected in the current video frame has a new state;

determine an object identifier for the object does not match an object identifier of a previously detected object that matches the object in the current video frame;

change a state of the object from the new state to a non-confirmed state based on the object identifier for the object not matching the object identifier of the previously detected object; and change a priority for the object to a base priority associated with the non-confirmed state in response to changing the state of the object from the new state to the non-confirmed state, wherein the base priority associated with the non-confirmed state is less than a base priority associated with the new state.

10. The apparatus of claim 1, wherein the processor is configured to:
   determine an object detected in the current video frame has a new state;
   determine the confidence score for the object is less than the first confidence threshold, wherein the first confidence threshold is used to identify a stranger, and wherein a stranger is an object not registered in the database of known objects;
   change a state of the object from the new state to a pre-stranger state based on the confidence score for the object being less than the first confidence threshold; and
   change a priority for the object to a base priority associated with the pre-stranger state in response to changing the state of the object from the new state to the pre-stranger state, wherein the base priority associated with the pre-stranger state is less than a base priority associated with the new state.

11. The apparatus of claim 1, wherein the processor is configured to:
   determine an object detected in the current video frame has a new state;
   determine the confidence score for the object is less than the first confidence threshold, wherein the first confidence threshold is used to identify a stranger, and wherein a stranger is an object not registered in the database of known objects;
   determine a history counter for the object is greater than a minimum counter threshold, the minimum counter threshold including a count of a number of video frames the confidence score for the object is less than the minimum confidence threshold;
   change a state of the object from the new state to a stranger state based on the confidence score for the object being less than the first confidence threshold and based on the history counter for the object being greater than the minimum counter threshold; and
   change a priority for the object to a base priority associated with the stranger state in response to changing the state of the object from the new state to the stranger state, wherein the base priority associated with the stranger state is less than a base priority associated with the new state.

12. The apparatus of claim 1, wherein the processor is configured to:
   determine an object detected in the current video frame has a confirmed state, the confirmed state indicating a confirmation that object recognition previously performed on the object was successful;
   determine an object identifier for the object matches an object identifier of a previously detected object that matches the object in the current video frame;
   maintain a state of the object in the confirmed state based on the object identifier for the object matching the object identifier of the previously detected object; and
   increase a priority for the object by a pre-defined amount in response to the state of the object being maintained in the confirmed state.

13. The apparatus of claim 1, wherein the processor is configured to:
   determine an object detected in the current video frame has a confirmed state, the confirmed state indicating a confirmation that object recognition previously performed on the object was successful;
   determine an object identifier for the object does not match an object identifier of a previously detected object that matches the object in the current video frame;
   determine the confidence score for the object is greater than the first confidence threshold, wherein the first confidence threshold is used to identify a stranger, and wherein a stranger is an object not registered in the database of known objects;
   change a state of the object from the confirmed state to a non-confirmed state based on the object identifier for the object not matching the object identifier of the previously detected object and based on the confidence score for the object being greater than the first confidence threshold; and
   change a priority for the object to a base priority associated with the non-confirmed state in response to changing the state of the object from the confirmed state to the non-confirmed state, wherein the base priority associated with the non-confirmed state is higher than a base priority associated with the confirmed state.

14. The apparatus of claim 1, wherein the processor is configured to:
   determine an object detected in the current video frame has a confirmed state, the confirmed state indicating a confirmation that object recognition previously performed on the object was successful;
   determine an object identifier for the object does not match an object identifier of a previously detected object that matches the object in the current video frame;
   determine the confidence score for the object is less than the first confidence threshold, wherein the first confidence threshold is used to identify a stranger, and wherein a stranger is an object not registered in the database of known objects;
   change a state of the object from the confirmed state to a pre-stranger state based on the object identifier for the object not matching the object identifier of the previously detected object and based on the confidence score for the object being less than the first confidence threshold; and
   change a priority for the object to a base priority associated with the pre-stranger state in response to changing the state of the object from the confirmed state to the pre-stranger state, wherein the base priority associated with the pre-stranger state is greater than a base priority associated with the confirmed state.

15. The apparatus of claim 1, wherein the processor is configured to:
   determine an object detected in the current video frame has a non-confirmed state;
   determine an object identifier for the object matches an object identifier of a previously detected object that matches the object in the current video frame;
   determine the confidence score for the object is greater than the first confidence threshold and is less than the second confidence threshold;
   change a state of the object from the non-confirmed state to a new state based on the object identifier for the object matching the object identifier of the previously detected object and based on the confidence score for the object being greater than the first confidence threshold and less than the second confidence threshold; and
   change a priority for the object to a base priority associated with the new state in response to changing the state of the object from the non-confirmed state to the new state, wherein the base priority associated with the new state is greater than a base priority associated with the non-confirmed state.

16. The apparatus of claim 1, wherein the processor is configured to:
  determine an object detected in the current video frame has a non-confirmed state;
  determine the confidence score for the object is greater than the second confidence threshold, wherein the second confidence threshold is used to confirm that object recognition previously performed on the object was successful;
  change a state of the object from the non-confirmed state to a confirmed state based on the confidence score for the object being greater than the second confidence threshold; and
  change a priority for the object to a base priority associated with the confirmed state in response to changing the state of the object from the non-confirmed state to the confirmed state, wherein the base priority associated with the confirmed state is less than a base priority associated with the non-confirmed state.

17. The apparatus of claim 1, wherein the processor is configured to:
  determine an object detected in the current video frame has a non-confirmed state;
  determine an object identifier for the object does not match an object identifier of a previously detected object that matches the object in the current video frame;
  maintain a state of the object in the non-confirmed state based on the object identifier for the object not matching the object identifier of the previously detected object; and
  increase a priority for the object by a pre-defined amount in response to the state of the object being maintained in the non-confirmed state.

18. The apparatus of claim 1, wherein the processor is configured to:
  determine an object detected in the current video frame has a non-confirmed state;
  determine the confidence score for the object is less than the first confidence threshold, wherein the first confidence threshold is used to identify a stranger, and wherein a stranger is an object not registered in the database of known objects;
  change a state of the object from the non-confirmed state to a pre-stranger state based on the confidence score for the object being less than the first confidence threshold; and
  change a priority for the object to a base priority associated with the pre-stranger state in response to changing the state of the object from the non-confirmed state to the pre-stranger state, wherein the base priority associated with the pre-stranger state is less than a base priority associated with the non-confirmed state.

19. The apparatus of claim 1, wherein the processor is configured to:
  determine an object detected in the current video frame has a pre-stranger state, wherein a stranger is an object not registered in the database of known objects;
  determine an object identifier for the object matches an object identifier of a previously detected object that matches the object in the current video frame;
  determine the confidence score for the object is greater than the first confidence threshold and is less than the second confidence threshold;
  change a state of the object from the pre-stranger state to a new state based on the object identifier for the object matching the object identifier of the previously detected object and based on the confidence score for the object being greater than the first confidence threshold and less than the second confidence threshold; and
  change a priority for the object to a base priority associated with the new state in response to changing the state of the object from the pre-stranger state to the new state, wherein the base priority associated with the new state is greater than a base priority associated with the pre-stranger state.

20. The apparatus of claim 1, wherein the processor is configured to:
  determine an object detected in the current video frame has a pre-stranger state, wherein a stranger is an object not registered in the database of known objects;
  determine an object identifier for the object matches an object identifier of a previously detected object that matches the object in the current video frame;
  determine the confidence score for the object is greater than the first confidence threshold and is less than the second confidence threshold;
  change a state of the object from the pre-stranger state to a non-confirmed state based on the object identifier for the object matching the object identifier of the previously detected object and based on the confidence score for the object being greater than the first confidence threshold and less than the first confidence threshold; and
  change a priority for the object to a base priority associated with the non-confirmed state in response to changing the state of the object from the pre-stranger state to the non-confirmed state, wherein the base priority associated with the non-confirmed state is greater than a base priority associated with the pre-stranger state.

21. The apparatus of claim 1, wherein the processor is configured to:
  determine an object detected in the current video frame has a pre-stranger state, wherein a stranger is an object not registered in the database of known objects;
  determine an object identifier for the object matches an object identifier of a previously detected object that matches the object in the current video frame;
  determine the confidence score for the object is less than the first confidence threshold, wherein the first confidence threshold is used to identify a stranger;
  determine a history counter for the object is less than a minimum counter threshold, the minimum counter threshold including a count of a number of video frames the confidence score for the object is less than the first confidence threshold;
  maintain a state of the object in the pre-stranger state based on the object identifier for the object matching the object identifier of the previously detected object, based on the confidence score for the object being less than the first confidence threshold, and based on the history counter for the object being less than the minimum counter threshold; and
  increase a priority for the object by a pre-defined amount in response to the state of the object being maintained in the pre-stranger state.

22. The apparatus of claim 1, wherein the processor is configured to:
  determine an object detected in the current video frame has a pre-stranger state, wherein a stranger is an object not registered in the database of known objects;

determine an object identifier for the object matches an object identifier of a previously detected object that matches the object in the current video frame;
determine the confidence score for the object is less than the first confidence threshold, wherein the first confidence threshold is used to identify a stranger;
determine a history counter for the object is greater than a minimum counter threshold, the minimum counter threshold including a count of a number of video frames the confidence score for the object is less than the first confidence threshold;
change a state of the object from the pre-stranger state to a stranger state based on the object identifier for the object matching the object identifier of the previously detected object, based on the confidence score for the object being less than the first confidence threshold, and based on the history counter for the object being greater than the minimum counter threshold; and
change a priority for the object to a base priority associated with the stranger state in response to changing the state of the object from the pre-stranger state to the stranger state, wherein the base priority associated with the stranger state is less than a base priority associated with the pre-stranger state.

23. The apparatus of claim 1, wherein the processor is configured to:
determine an object detected in the current video frame has a stranger state, wherein a stranger is an object not registered in the database of known objects;
determine an object identifier for the object matches an object identifier of a previously detected object that matches the object in the current video frame;
determine the confidence score for the object is greater than the first confidence threshold and is less than the second confidence threshold;
determine a history counter for the object is greater than a first counter threshold, the first counter threshold including a count of a number of video frames the confidence score for the object is greater than the first confidence threshold;
change a state of the object from the stranger state to a new state based on the object identifier for the object matching the object identifier of the previously detected object, based on the confidence score for the object being greater than the first confidence threshold and less than the second confidence threshold, and based on the history counter for the object being greater than the first counter threshold; and
change a priority for the object to a base priority associated with the new state in response to changing the state of the object from the stranger state to the new state, wherein the base priority associated with the new state is greater than a base priority associated with the stranger state.

24. The apparatus of claim 1, wherein the processor is configured to:
determine an object detected in the current video frame has a stranger state, wherein a stranger is an object not registered in the database of known objects;
determine an object identifier for the object matches an object identifier of a previously detected object that matches the object in the current video frame;
determine the confidence score for the object is greater than the first confidence threshold and is less than the first confidence threshold;
change a state of the object from the stranger state to a pre-stranger state based on the object identifier for the object matching the object identifier of the previously detected object and based on the confidence score for the object being greater than the first confidence threshold and less than the second confidence threshold; and
change a priority for the object to a base priority associated with the pre-stranger state in response to changing the state of the object from the stranger state to the pre-stranger state, wherein the base priority associated with the pre-stranger state is greater than a base priority associated with the stranger state.

25. The apparatus of claim 1, wherein the processor is configured to:
determine an object detected in the current video frame has a stranger state, wherein a stranger is an object not registered in the database of known objects;
determine an object identifier for the object matches an object identifier of a previously detected object that matches the object in the current video frame;
determine the confidence score for the object is less than the first confidence threshold, wherein the first confidence threshold is used to identify a stranger; and
maintain a state of the object in the stranger state based on the object identifier for the object matching the object identifier of the previously detected object and based on the confidence score for the object being less than the first confidence threshold; and
increase a priority for the object by a pre-defined amount in response to the state of the object being maintained in the stranger state.

26. The apparatus of claim 1, wherein the plurality of objects include a plurality of faces, and wherein the object recognition includes face recognition.

27. The apparatus of claim 1, wherein the apparatus comprises a mobile device comprising one or more of a camera for capturing the one or more video frames and a display for displaying the one or more video frames.

28. A method of prioritizing objects for object recognition in one or more video frames, the method comprising:
obtaining a current video frame;
detecting a plurality of objects in the current video frame;
determining state information associated with the plurality of objects, wherein state information associated with an object is determined based at least in part on a confidence score of whether the object is registered in a database of known objects;
determining priorities for the plurality of objects, wherein a priority is determined for an object based on state information associated with the object, and wherein priorities for objects with confidence scores below a first confidence threshold and priorities for objects with confidence scores above a second confidence threshold that is greater than the first confidence threshold are lower than priorities for objects with confidence scores between the first confidence threshold and the second confidence threshold; and
performing object recognition for one or more objects from the plurality of objects based on one or more priorities determined for the one or more objects, wherein object recognition is performed for objects having higher priorities before objects having lower priorities.

29. The method of claim 28, further comprising:
obtaining object identifiers, confidence scores, and history counter information for the plurality of objects, wherein history counter information for an object indicates at least a number of frames the object has had a current state; and determining the state information for the plurality of objects based on the object identifiers, the confidence scores, and the history counter information for the plurality of objects.

30. The method of claim 28, further comprising increasing a priority for an object for the current video frame by a pre-defined amount in response to a state of the object being maintained in a current state for the current video frame.

\* \* \* \* \*